(12) United States Patent
Visuri et al.

(10) Patent No.: US 12,108,298 B2
(45) Date of Patent: *Oct. 1, 2024

(54) CROSS-OPTIMIZATION IN MOBILE NETWORKS

(71) Applicant: Aglocell, Inc., Warrensville, IL (US)

(72) Inventors: Pertti Visuri, Fallbrook, CA (US); Randy Salo, La Jolla, CA (US); Sven Seuken, Zurich (CH); Jay Dills, San Diego, CA (US); Fabio Elia Isler, Hünibach (CH); Christian Van Hamersveld, San Marcos, CA (US); Johanna Visuri, Solana Beach, CA (US); Dan Zagursky, San Diego, CA (US)

(73) Assignee: Aglocell, Inc., Warrensville, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/990,535

(22) Filed: Nov. 18, 2022

(65) Prior Publication Data

US 2023/0328612 A1    Oct. 12, 2023

Related U.S. Application Data

(63) Continuation of application No. 16/800,836, filed on Feb. 25, 2020, now Pat. No. 11,510,124.
(Continued)

(51) Int. Cl.
*H04W 36/22* (2009.01)
*H04W 36/14* (2009.01)
*H04W 36/32* (2009.01)

(52) U.S. Cl.
CPC .......... *H04W 36/22* (2013.01); *H04W 36/14* (2013.01); *H04W 36/32* (2013.01)

(58) Field of Classification Search
CPC ...... H04W 36/22; H04W 36/14; H04W 36/32
See application file for complete search history.

(56) References Cited

U.S. PATENT DOCUMENTS

2009/0163223 A1   6/2009 Casey
2011/0319110 A1*  12/2011 Futaki .................. H04W 24/02
                                                          455/507
(Continued)

OTHER PUBLICATIONS

International Search Report and Written Opinion for corresponding PCT/US2020/019748, mailed on May 7, 2020.
(Continued)

*Primary Examiner* — Mazda Sabouri
(74) *Attorney, Agent, or Firm* — Kaspar Law Company, LLC; Scott R. Kaspar

(57) ABSTRACT

Cross-optimization in wireless mobile networks. In an embodiment, a demand map is received for each of a plurality of networks. The demand map represents demand at a plurality of geographic locations in at least one cell of the network. Based on the demand maps, an optimal transfer of demand is generated between the plurality of networks at one or more of the plurality of geographic locations at which the plurality of networks overlap. Then, one or more parameters, to be used by at least one of the plurality of networks in a handover procedure, is determined, so as to produce the optimal transfer of demand between the plurality of networks at the one or more geographic locations at which the plurality of networks overlap.

17 Claims, 16 Drawing Sheets

Related U.S. Application Data

(60) Provisional application No. 62/810,268, filed on Feb. 25, 2019.

(56) References Cited

U.S. PATENT DOCUMENTS

| | | |
|---|---|---|
| 2014/0004862 A1 | 1/2014 | Ekemark |
| 2015/0111575 A1* | 4/2015 | Lei .................... H04W 28/0289 |
| | | 455/436 |
| 2015/0126192 A1 | 5/2015 | Huang et al. |
| 2015/0189533 A1* | 7/2015 | Fehske .................. H04W 16/18 |
| | | 370/229 |
| 2015/0312805 A1 | 10/2015 | Cui et al. |
| 2016/0021503 A1* | 1/2016 | Tapia .................... H04W 24/02 |
| | | 455/456.1 |
| 2016/0157126 A1 | 6/2016 | Nuss et al. |
| 2016/0219478 A1* | 7/2016 | Huang-Fu ........... H04W 28/085 |
| 2017/0142595 A1* | 5/2017 | Ljung ................ H04B 7/18504 |
| 2017/0359748 A1 | 12/2017 | Fehske et al. |
| 2018/0092001 A1 | 3/2018 | Austin et al. |
| 2019/0208438 A1 | 7/2019 | Yang et al. |
| 2019/0281497 A1* | 9/2019 | Nieminen ............. H04W 28/18 |
| 2020/0187036 A1* | 6/2020 | Chen ....................... H04W 8/24 |

OTHER PUBLICATIONS

Extended European Search Report dated Nov. 23, 2022 for corresponding European Patent Application No. 20763819.8.

\* cited by examiner

CROSS-OPTIMIZATION IN MOBILE NETWORKS

CROSS-OPTIMIZATION IN MOBILE NETWORKS

This application is a continuation of U.S. patent application Ser. No. 16/800,836, filed on Feb. 25, 2020, which claims priority to U.S. Provisional Patent Application No. 62/810,268, filed on Feb. 25, 2019, which are both hereby incorporated herein by reference as if set forth in full.

BACKGROUND

Field of the Invention

The embodiments described herein are generally directed to network optimization, and, more particularly, to optimizing network loads by transferring mobile devices across network or network layer boundaries.

Description of the Related Art

As the data consumption of mobile devices (sometimes referred to as "user equipment" (UE) or "handsets") has continued to grow, newer technologies have increased the speed and efficiency of data transfer. Going from initial analogue cellular networks to 3G and 4G has resulted in changes in how the frequency spectrum is deployed across a cellular network with several cell sites. Initially, frequency bands were used in an alternating way, so that interference within the same frequency band was managed by separating the cells and using different frequency bands between neighboring cells.

Handovers typically happened from one frequency to another, as the mobile devices moved through the coverage area. With Long Term Evolution (LTE) and 4G networks, all data is delivered in packets, and the so-called scheduler that operates in the eNodeB for each cell can help with interference management. As a result, the current practice is to deploy all available frequencies in all cell sites.

Careful tuning and optimization is necessary to achieve good performance from cellular networks. The coverage area of each cell sector depends on the signal strength and on the antenna parameters and orientation. It also depends on so-called reconfiguration parameters that are provided to each mobile device by the eNodeB. These reconfiguration parameters determine under which conditions mobile devices begin to look for a different sector and how their handover to a different sector will be handled.

To a limited extent, the same reconfiguration parameters can be used to manage the relative load in two adjacent cells. They are sometimes used for so-called mobile load balancing (MLB). In mobile load balancing, if the load in a given cell gets too high and an adjacent cell has a lower load, it is possible to change the so-called cell individual offset (CIO) parameters, which determine the relative signal quality that will initiate a handover to the adjacent cell. These CIO parameters are part of the reconfiguration parameters that are provided to the mobile devices by the eNodeB in each mobile device's cell.

Using mobile load balancing between adjacent cells requires a trade-off. It is possible to lessen the load by effectively making the coverage area of a highly loaded cell smaller by moving devices from a higher signal level (e.g., measured by signal-to-interference-and-noise ratio (SINR)) to a neighboring cell that may have a poorer signal (lower SINR) at that location. However, this automatically results in these moved mobile devices receiving their service using the poorer signal. This may still be a good trade-off, since the quality of service (QoS) depends on both the signal quality and the load level of the serving cell.

This kind of mobile load balancing is one of the functions of a so-called self-organizing network (SON) system. SONs carry out other optimization tasks as well. For example, they can optimize the use of different frequency bands in a cell site by transferring devices from one band to another within an eNodeB. Sometimes they can also have so-called self-healing features. For example, if one radio transmitter malfunctions or a particular cell becomes inoperable, some SONs can change the antenna parameters and try to provide coverage in areas that otherwise would not be served by the network.

As mobile data demand continues to grow, it is necessary to add capacity to mobile networks. The addition of capacity usually means adding a new frequency band to an existing cell, or adding new cells sites and shrinking the coverage area of existing cell sites. The capacity additions usually result in a significant step up in existing capacity at each location where they are implemented. The results can be used for researching how to add capacity in the future, so as to optimally absorb the continuing growth in demand in particular locations.

This continuous growth in all locations and these "chunky" additions of capacity result in uneven load percentage and large capacity reserves. As illustrated in FIG. 1, the creation of large capacity reserves 110 is a direct result of continuous demand growth and the methods used for adding local capacity. Specifically, the necessity to build capacity for future demand results in low load percentages in recently upgraded areas (e.g., area 120), and high load percentages in the locations that have gone the longest without upgrades (e.g., area 130). Capacity reserves, created by including future reserves in network upgrades, may exist in cells that have been recently upgraded (e.g., area 120), while other cells (e.g., adjacent area 130) are under high load and in need of additional capacity. However, these reserves are difficult to harness given the trade-off of mobile load balancing explained above.

In practice, there is a distribution of various load percentage levels in all cellular networks that have been subject to continuous demand growth for a long period of time. The percentage of capacity that is actually being used in each cell in an LTE 4G network is typically measured by the so-called physical resource block (PRB) occupation or cell load. PRB occupation indicates what percentage of all possible resource blocks, which are continuously transmitted by the eNodeB, actually carry data at any given time.

When PRB occupation is plotted for a network during the busiest hours of its operation, organizing the cells from smallest load to the highest load, it invariably looks like the graph in FIG. 2A. FIG. 2A shows a typical distribution of all percentages of actual cell load 210 in a network. As illustrated, 40% is generally considered an acceptable load level 220. FIG. 2A illustrates a typical distribution 230 of the average PRB occupation level, measured over an hour of network operation. The reason that it is not generally acceptable to operate a mobile network at a higher percentage than acceptable load level 220 is that, as mentioned earlier, the average speed of the data connections in a cell depends on its average load level.

Comparing distribution 230 of actual busy-hour load in FIG. 2A to the acceptable load level 220 clearly shows that only about one third of the usable capacity is being used in a typical network. This is not by choice. Rather, it is a consequence of the network structure, the relentless demand growth, and the inadequacy of currently used mechanisms to balance the load across network geography.

FIG. 2B illustrates the poor utilization and high number of underutilized cells as a histogram of load distribution. Specifically, a large number of cells 240 have low load levels under 10%, whereas a few cells 250 have high loads around or above acceptable load level 220 (i.e., 40%). These few cells 250 are what drive the need for investments in network upgrades.

SUMMARY

Accordingly, systems, methods, and non-transitory computer-readable media are disclosed to optimize network loads by transferring mobile devices across network or network layer boundaries.

In an embodiment, a method is disclosed that comprises using at least one hardware processor to: for each of a plurality of networks, receive a demand map that represents demand at a plurality of geographic locations in at least one cell of the network; generate an optimal transfer of demand between the plurality of networks at one or more of the plurality of geographic locations at which the plurality of networks overlap based on the demand maps; and determine one or more parameters to be used by at least one of the plurality of networks in a handover procedure of the at least one network to produce the optimal transfer of demand between the plurality of networks at the one or more geographic locations at which the plurality of networks overlap. The plurality of networks may be wireless cellular networks or a plurality of network layers within one or more wireless cellular networks.

In an embodiment, each demand map comprises an average demand over a time period at each of the plurality of geographic locations. Each demand map may comprise the average demand over the time period for one or more simulated mobile devices at each of the plurality of geographic locations. The plurality of networks may comprise a first network and a second network, wherein generating the optimal transfer of demand comprises, when a network load in the first network at one of the plurality of geographic locations at which the first and second networks overlap is higher than a network load in the second network at that one geographic location, transferring one or more of the simulated mobile devices in the first network at that one geographic location to the second network. The method may further comprise using the at least one hardware processor to, for each of the plurality of networks, receive quality information in association with the demand map for that network, wherein the quality information comprises a signal quality or throughput at the plurality of geographic locations, and wherein the optimal transfer of demand is generated further based on the quality information. The one or more simulated mobile devices to be transferred, at the geographic location at which the first and second networks overlap, may be selected based on the signal information, so as to improve the signal quality or throughput of the one or more simulated mobile devices via the transfer.

The method may further comprise using the at least one hardware processor to, for each of the plurality of networks, generate the demand map from a model of the at least one cell of the network. The method may further comprise using the at least one hardware processor to, for each of the plurality of networks, receive one or more objectives, wherein the optimal transfer of demand is determined based on the one or more objectives. The one or more objectives may comprise maintaining a relative performance difference between the plurality of networks. The method may further comprise using the at least one hardware processor to, based on the objective of maintaining the relative performance difference between the plurality of networks, analyze the demand maps for the plurality of networks to identify the relative performance difference between the plurality of networks, wherein the optimal transfer of demand is generated such that the relative performance difference is the same after the transfer of demand as before the transfer of demand. The method may further comprise using the at least one hardware processor to, after generating the optimal transfer of demand and before determining the set of parameters, for each of the plurality of networks, generate a modified demand map from the demand map received for that network, wherein the modified demand map represents the optimal transfer of demand to or from that network. The method may further comprise using the at least one hardware processor to, for each of the plurality of networks, provide the modified demand map to at least one recipient. The method may further comprise using the at least one hardware processor to, over a plurality of iterations until one or more objectives are satisfied, for one or more of the plurality of networks, receive a demand map, generate the optimal transfer of demand, generate a modified demand map, and provide the modified demand map to at least one recipient.

The method may further comprise using the at least one hardware processor to deliver the set of one or more parameters to the at least one network. Delivering the one or more parameters to the at least one network may comprise sending the one or more parameters through an interface with the at least one network. The interface may be an application programming interface (API) of a self-optimizing network (SON).

In an embodiment, the one or more parameters comprise one or more neighbor cells, in one or more networks that are different than the at least one network, to be used in a neighbor list for mobile devices connected to the at least one network in at least one of the plurality of geographic locations at which the plurality of networks overlap. The one or more parameters may further comprise a value for a cell individual offset (CIO) of each of the one or more neighbor cells. Determining the one or more parameters may comprise computing the value for each CIO of each of the one or more neighbor cells, so as to trigger the optimal transfer of demand between the plurality of networks during real-time operation of the plurality of networks.

In an embodiment, each demand map is associated with a reoccurring time period, wherein the method further comprises using the at least one hardware processor to generate a profile that associates the one or more parameters with the reoccurring time period. The reoccurring time period may be one or both of a time of day and a day of a week. The method may further comprise using the at least one hardware processor to, for each of a plurality of different profiles, initiate use of the one or more parameters in the profile at each occurrence of the associated reoccurring time period.

In an embodiment, the plurality of networks comprise a first network and a second network, wherein, for each of the first and second networks, the received demand map represents demand at a plurality of geographic locations in a plurality of cells of the network, and wherein generating the optimal transfer of demand comprises transporting demand over a geographic distance by: starting at a first end of the geographic distance, for one or more hops, until a second end of the geographic distance is reached, transferring an amount of demand at an edge of a cell in the first network to a cell in the second network that overlaps both the edge of the cell in the first network and an edge of another cell in the first network, and transferring the same amount of demand from the cell in the second network to the other cell in the first network, such that the amount of demand is transferred from a starting cell in the first network at the first end to an ending cell in the first network at the second end, without changing a load level in any cells in the first and second networks other than the starting and ending cells in the first network. The starting cell may provide coverage to one of either a commercial area or a residential area, and the ending cell may provide coverage to the other one of either the commercial area or the residential area.

The method may be embodied in executable software modules of a processor-based system, such as a server, and/or in executable instructions stored in a non-transitory computer-readable medium.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Figure 1:
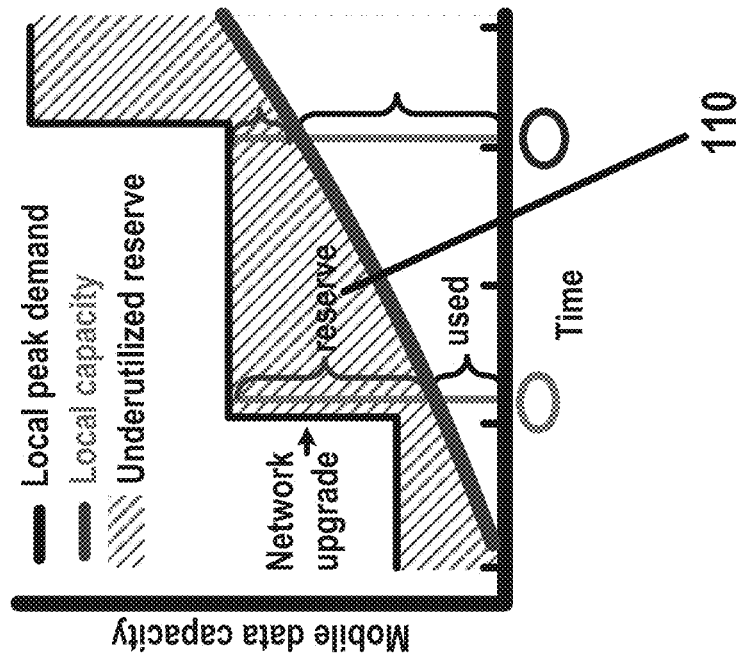
FIG. 1 illustrates capacity reserves resulting from demand growth.
Figure 1:
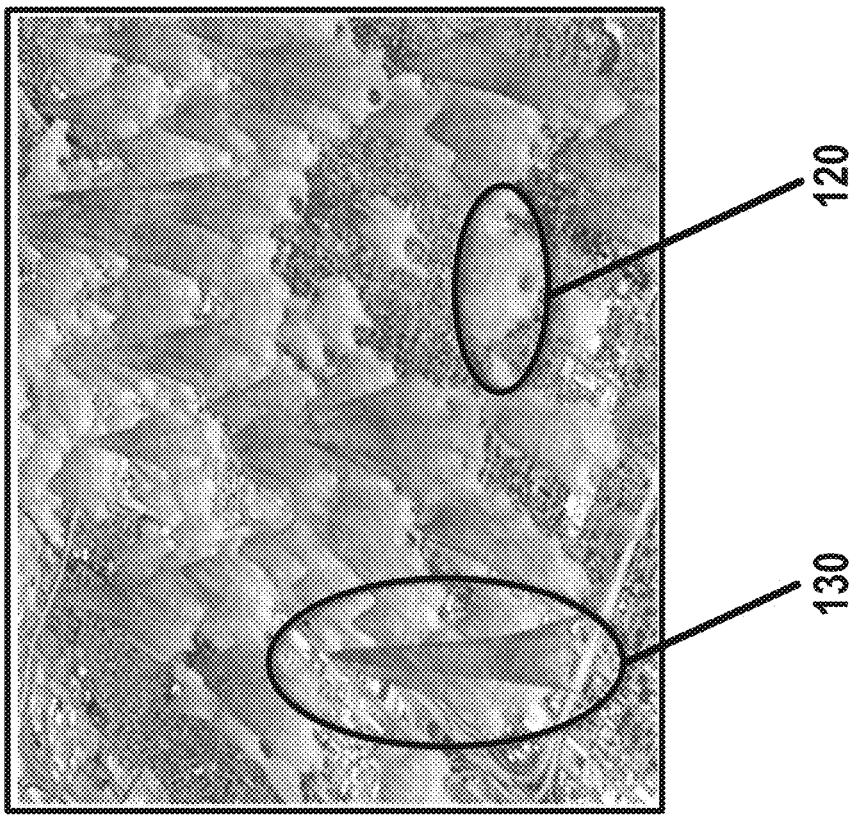
Figure 2A:
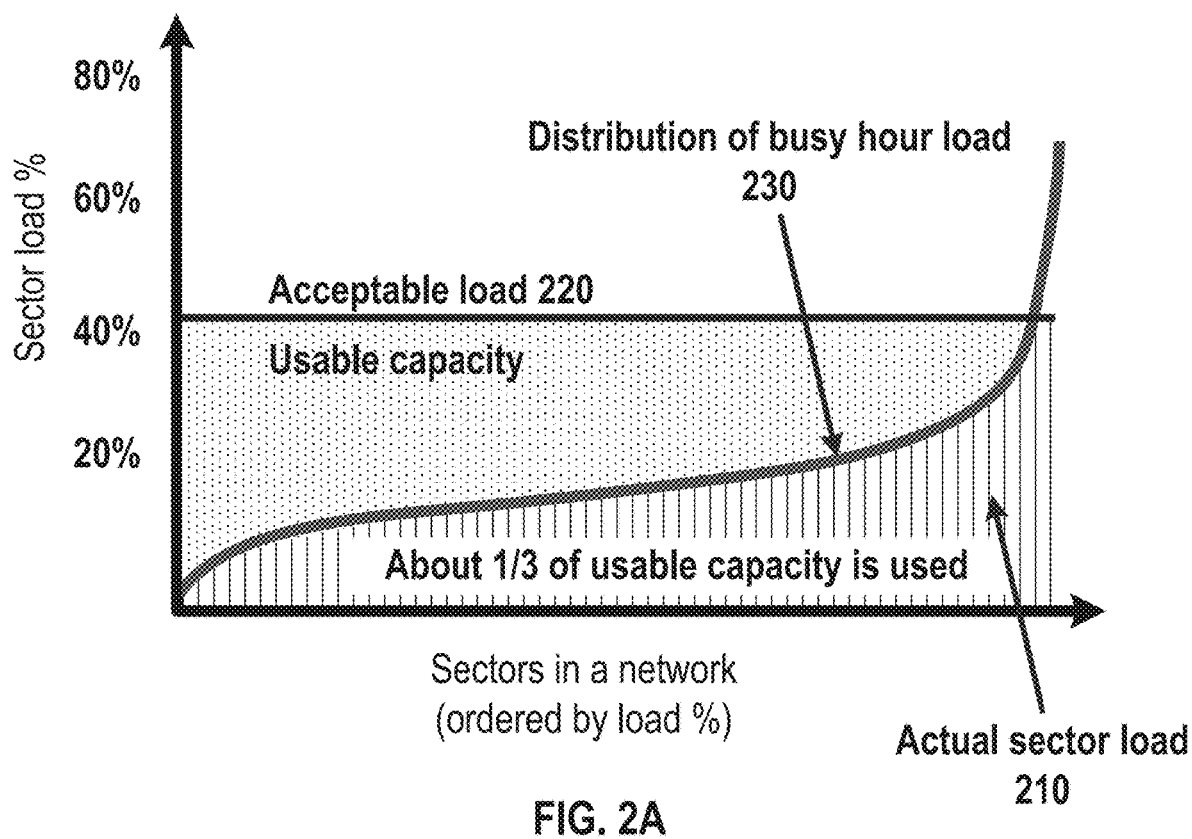
FIGS. 2A and 2B illustrate typical load distribution in a network.
Figure 2B:
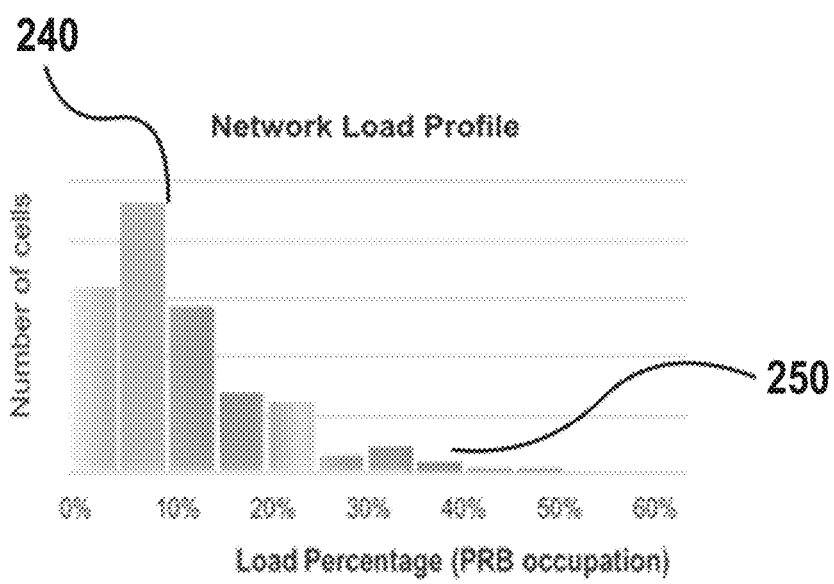

In an embodiment, systems, methods, and non-transitory computer-readable media are disclosed for optimizing network loads by transferring mobile devices across network or network layer boundaries. After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

1. Introduction to Cross Optimization

The present disclosure describes systems and methods for optimizing the network load across large geographic areas and multiple cells. This cross optimization is based on accessing a network topology to create new ways of balancing loads across multiple networks or network layers. It also utilizes a systematic and advanced way to set goals or objectives for optimal network operations, and utilizes existing mechanisms of the 3rd Generation Partnership Project (3GPP) standard, initially created by the European Telecommunications Standards Institute (ETSI), to control the selection of serving cells by mobile devices and handle handovers in cellular networks.

The ability to balance the load and to optimize many functional parameters in cellular networks becomes much better if the optimization can be done across two or more independent frequency bands that are deployed in a particular way. In some cases, there are two layers in a network, both operating in their own frequencies and each providing full coverage for the area to be optimized. These two radio access networks (RANs) may have the same network identifier. In addition, these two RANs may be connected to the same core network, or they may be completely separate networks, each with its own core network owned by a different mobile network operator (MNO). For simplicity, the term "network" will be used herein to denote each independent frequency layer in a network system, even if these frequency layers belong to one mobile operator and share a core network.

In the primary embodiment described herein, there are two or more networks from two or more MNOs participating in the optimization. In this case, each network should have the ability to provide roaming service to mobile devices of the other network(s), and handle the roaming handoffs without interruption in the connection or session. There are well-known solutions for providing roaming services in a network. For example, the ETSI and 3GPP standards specify S10 and S8 interfaces between mobility management entities (MMES) in each network.

The two or more networks may also have mostly separate and different cell sites. Alternatively, the networks may share a single cell site. In the case of a single shared cell site, the directions of the sector antennas (generally referred to as "Azimuths") may be different, or the best-server areas may be different between the different networks. This results in a structure in which each serving area of a cell sector in one network layer has partial overlap with serving areas of a number of cell sectors in the other network layer.

Figure 3A:
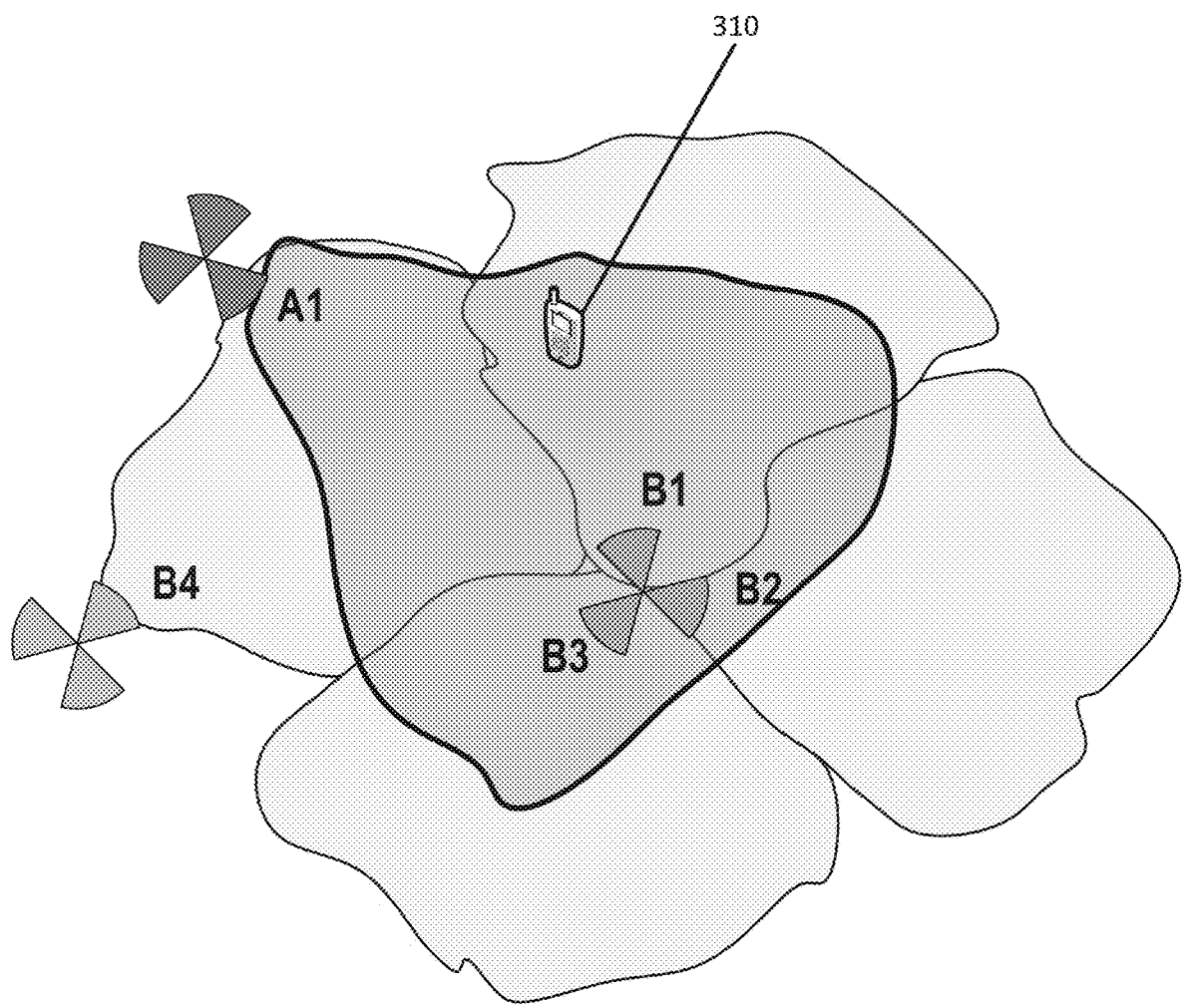
FIGS. 3A and 3B illustrate overlapping networks, according to an embodiment.

FIG. 3A illustrates an example of the partial overlap areas resulting from different cell sites or different directional orientation of the cell sectors in a single shared cell site, according to an embodiment. Specifically, cell A1 in network A is partially overlapped by four different cell coverage areas in network B (i.e., B1, B2, B3, and B4). This creates four overlap areas. Each of the overlap areas has a unique pair of cells, one from each of networks A and B which are the "best servers" within that overlap area. For example, this means that a mobile device 310 in the overlap area denoted by cells A1 and B1 would be connected to cell A1, if it was served by network A, and to cell B1, if it was served by network B.

As previously discussed, the separate networks A and B may be truly different networks, owned by different MNOs, or may belong to different frequency layers deployed within a network owned by a single MNO. In the illustrated example, each network A and B has complete coverage of the geographic area that will be optimized. However, the techniques described herein can also be applied, to at least some extent, even when complete coverage by both networks A and B is not available. In the majority of cases, the cell sites of competing MNOs are separate and located in different places, with each operator's network utilizing frequency bands that are separate from the other operator's frequency bands. One immediately available method for arranging access to the network topology described above is for an MNO (e.g., the operator of network A) to arrange a roaming agreement with another MNO (e.g., the operator of network B) to have usage access to at least a limited level of the mobile network of that other MNO that is covering the same area.

Cross optimization across the networks of two or more separate MNOs can be very effective in improving the network performance and the economics of network operation, since the network capacity upgrade cycle, described with respect to FIG. 1, takes place independently for each of the MNOs. Specifically, as a result of these independent upgrade cycles, the network load in any given location for the two operators is going to be different. In other words, in a location where one mobile network may have a high percentage load and needs capacity, the other network operator will likely have reserve capacity resulting from the nature of its independent upgrade cycle.

However, the cross optimization described herein can also be applied by a single MNO in its own network. In this case, the operator can evolve its network topology to the one illustrated in FIG. 3A. As new frequencies are added or re-farmed from older technologies, they can be deployed in a way that creates the partial overlap described with respect to networks A and B. In addition, the operator can time the network capacity upgrades in the two independent frequency layers A and B deliberately so that they are not happening in the same geographic area at the same time. This will create the desirable situation where one network layer has reserve capacity at the times and locations at which the other network layer has a need for additional capacity.

Alternatively, a single MNO may end up with the network topology, illustrated in FIG. 3A, as the result of an acquisition or merger with another MNO. In this case, one MNO generally acquires an independent MNO that has overlapping coverage with its existing network. Thus, the desirable network topology of partial overlapping cells with differing local capacity reserves will be immediately available to the MNO.

Regardless of the scenario in which it occurs, the combination of different reserve capacities in each local area and the partial overlap between cells in the two networks in those local areas makes the proposed cross optimization powerful in providing better optimization for network operations in both networks. Each specific partial overlap area provides an opportunity to transfer mobile devices from one network to another, for example, from one known cell in network A to another known cell in network B.

The total demand of cell A1 in FIG. 3A consists of the data demand of the mobile devices within its coverage area. Each of these mobile devices are in an overlapping coverage area of at least one of cells B1-B4 in network B. If there is a need to reduce load in cell A1, this could be accomplished by transferring mobile devices from cell A1 to any of the cells B1-B4, or to any combination of these four overlapping cells in network B. The standard mechanisms for initiating such handover from one network to another network are discussed elsewhere herein. For now, the focus is on the effect of such transfers on the load (e.g., PRB occupation percentage) in each of the two networks A and B.

The actual load contribution of each of the mobile devices in cell A1 depends, not only on their demand for data, but also on their signal quality. Mobile devices with better signal quality (e.g., higher SINR) will have more efficient data transfer, and therefore, require fewer PRBs to satisfy their data needs than devices with poorer signal quality. Signal quality depends on several factors, including whether the mobile device is inside a building, what obstacles are between the transmitter and the receiver of the wireless signal, and/or the like.

In real-world conditions, the coverage and best-server areas of cells may not be as clear and contiguous, as illustrated in the figures. However, for simplicity of description, the distance between the transmitter and the receiving mobile device may be used herein to represent the signal quality of a connection (i.e., with longer distances representing lower signal quality, and shorter distances representing higher signal quality) or the throughput of mobile devices in a given area.

Figure 3B:
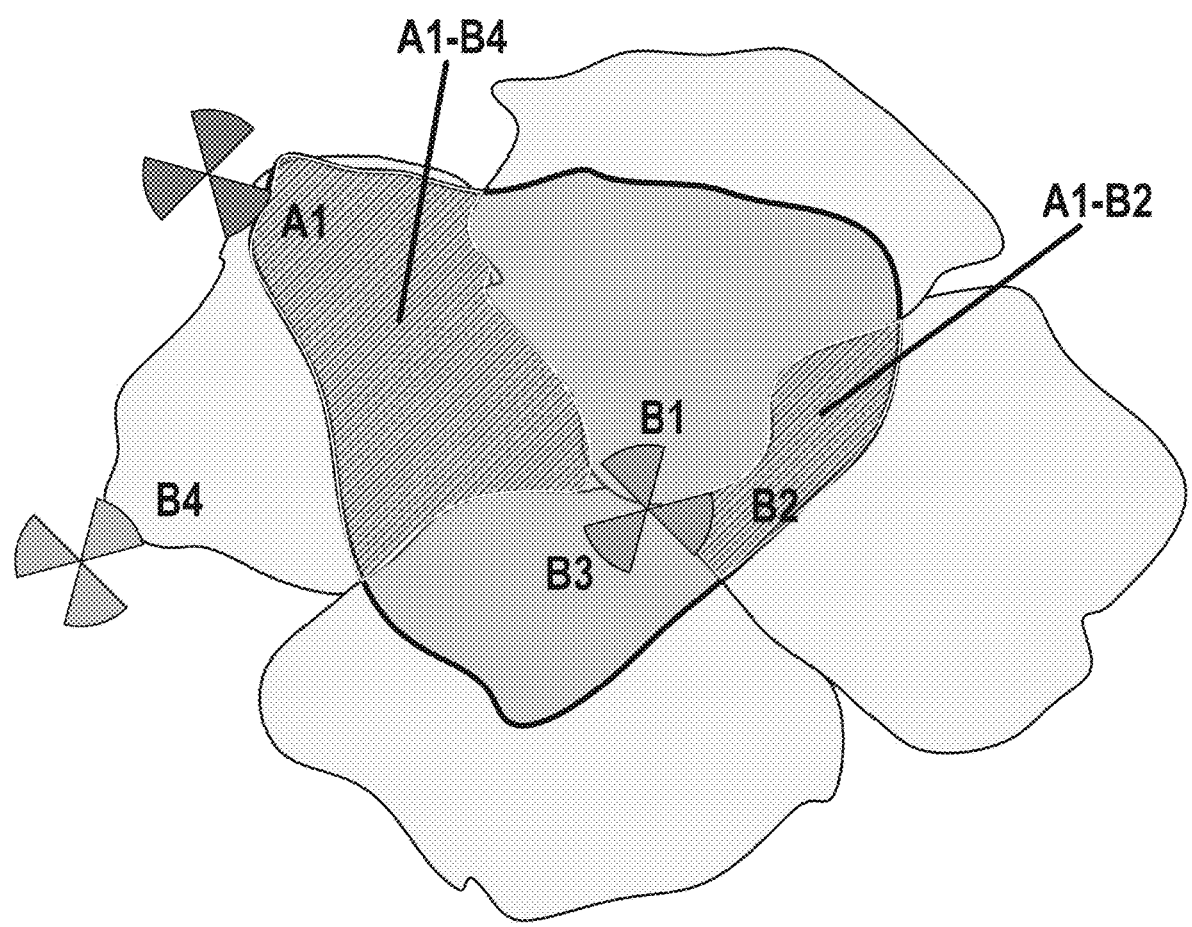

As illustrated in FIG. 3B, some partial overlap areas in networks A and B are closer to transmitters in network B than they are to transmitters in network A. For instance, the mobile devices in the overlap area A1-B2 are much farther from the transmitter of cell A1 than they are from the transmitter of cell B2. Therefore, moving a mobile device, which is located in overlap area A1-B2, from cell A1 to cell B2 will make a larger contribution to reducing the load in network A, than it will to increasing the load in network B. Therefore, all things equal, such a transfer would be more efficient than, for example, transferring a mobile device that is located in overlap area A1-B4 from cell A1 to cell B4. However, there are other considerations in deciding how to reduce the load in cell A1. For example, the respective load situations and load targets for cells B1-B4 should also be considered.

In any case, it is apparent from FIG. 3B that arranging a partial overlap between two networks A and B, and carefully controlling how much load and demand is transferred from one network to the other, in each partial overlapping area, provides a powerful mechanism for optimizing the specific cell loads in both of the participating networks. Thus, in an embodiment, the disclosed cross optimization comprises analyzing load distributions and other performance parameters, such as throughputs in the two networks, and optimizing the parameters to achieve given targets by selectively transferring connections of mobile devices, from one network to the other network in each of the partial overlap areas for all the cells, utilizing standard connection control and handover mechanisms (e.g., as defined in the 3GPP standards). As used herein, the term "cross optimization" refers to the extension of optimization of wireless networks across network boundaries. These boundaries may include the ownership and control systems of the network (e.g., different MVOs). Alternatively or additionally, these boundaries may include different types of network radio access technology (RAT), including, without limitation, Wi-Fi™ 2G, 3G, 4G, LTE, 5G, and/or the like. For example, network A may be a cellular network (e.g., 2G, 3G, 4G, LTE, 5G, etc.), and network B may be a Wi-Fi™ network.

All optimization can increase efficiency in resource usage. However, expanding the realm of resources to distribute mobile devices across multiple networks provides additional efficiencies in resource usage in wireless communications. Specifically, the disclosed embodiments expand the realm of optimization from a single network to two or more separate overlapping networks. A study of the effects of optimization across existing overlapping networks, which may have already been optimized within their own boundaries, shows that this broader optimization can double the total combined capacity, and dramatically improve the speeds of service that the individual mobile devices on these networks experience.

Another potential benefit of the disclosed cross optimization is that it allows the MNOs and mobile service providers to define the objectives for the network operational parameters, such as peak load levels, such that the cross optimization will reflect these preferences. An ideal scenario for getting the maximum benefit from the disclosed cross optimization includes: (i) independent frequency layers in the two networks to be optimized; (ii) partial overlap of the cells in the two networks; (iii) ability to determine the optimum load transfer between the networks in each of the partial overlap areas of specific network cells; and (iv) mechanisms for controlling the network selection of the mobile devices between the two networks.

2. Infrastructure for Cross Optimization

In an embodiment, the disclosed cross optimization is implemented as software, hosted in a cloud infrastructure, and adds a new dimension to managing and optimizing mobile networks. For example, cross optimization enables mobile operators to exchange capacity in LTE and 5G RANs in a controlled manner. Cross optimization may use cloud-computing resources to optimize load distribution and signal conditions across participating networks. This can dramatically reduce cost, improve subscriber experience, and create new opportunities for wholesale revenue.

Figure 4:
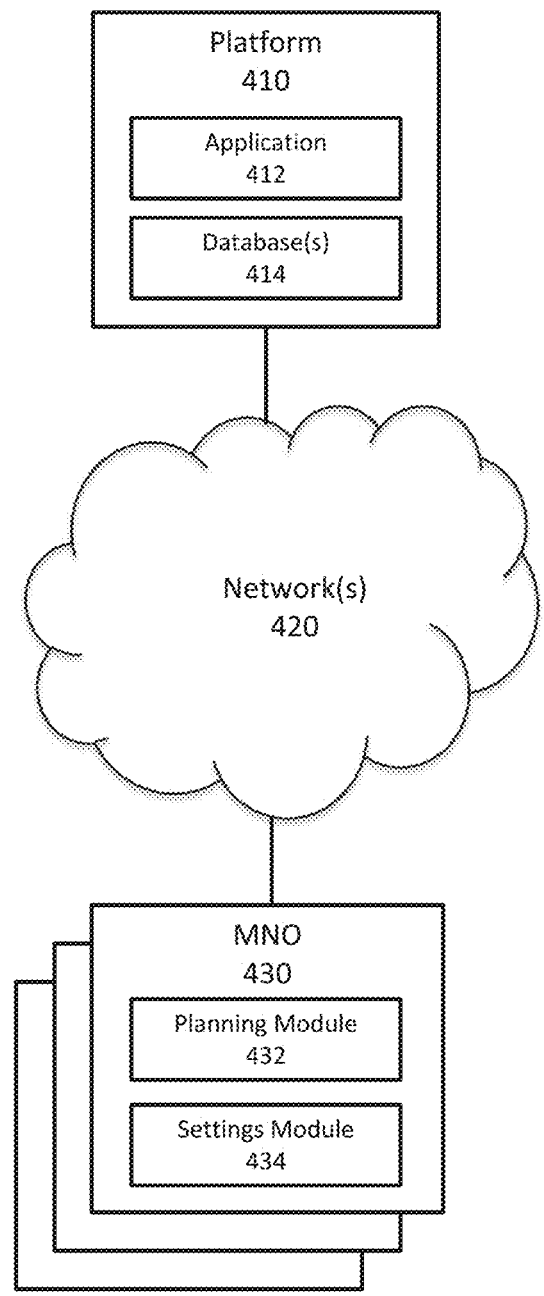
FIG. 4 illustrates an infrastructure in which disclosed processes may be implemented, according to an embodiment.

FIG. 4 illustrates an infrastructure in which the disclosed cross optimization operates, according to an embodiment. Specifically, a cross-optimization platform 410 may host and/or execute an application 412, which implements one or more of the various functions, processes, methods, and/or software modules described herein. In addition, platform 410 may comprise or be communicatively connected to one or more databases 414 (e.g., MySQL™, Oracle™, IBM™, Microsoft SQL™, Access™, and the like, including cloud-based databases and proprietary databases). Platform 410 may comprise dedicated servers, or may instead comprise cloud instances, which utilize shared resources of one or more servers. These servers or cloud instances may be collocated and/or geographically distributed. Platform 410 may be communicatively connected to one or more MNO systems 430 via one or more networks 420.

Network(s) 420 may comprise the Internet, and platform 410 may communicate with user system(s) 430 through the Internet using standard transmission protocols, such as HyperText Transfer Protocol (HTTP), HTTP Secure (HTTPS), File Transfer Protocol (FTP), FTP Secure (FTPS), Secure Shell FTP (SFTP), and the like, as well as proprietary protocols. It should be understood that references to network(s) 420 which communicatively connect platform 410 to MNO systems 430 are distinct from references to the mobile networks (e.g., networks A and B in FIGS. 3A and 3B) that are being optimized by platform 410.

MNO systems 430 may comprise any type or types of computing devices capable of wired and/or wireless communication, including without limitation, desktop computers, laptop computers, tablet computers, smart phones or other mobile phones, servers, and/or the like. Each MNO system 430 may comprise a planning module 432 and settings module 434. Planning module 432 and settings module 434 may implemented as software modules executed by the same or different processing devices within MNO system 430.

Platform 410 may comprise web servers which host one or more websites and/or web services. In embodiments in which a website is provided, the website may comprise a graphical user interface, including, for example, one or more screens (e.g., webpages) generated in HyperText Markup Language (HTML) or other language. Platform 410 transmits or serves one or more screens of the graphical user interface in response to requests from MNO system(s) 430. In some embodiments, these screens may be served in the form of a wizard, in which case two or more screens may be served in a sequential manner, and one or more of the sequential screens may depend on an interaction of the user or MNO system 430 with one or more preceding screens. The requests to platform 410 and the responses from platform 410, including the screens of the graphical user interface, may both be communicated through network(s) 420, which may include the Internet, using standard communication protocols (e.g., HTTP, HTTPS, etc.). These screens (e.g., webpages) may comprise a combination of content and elements, such as text, images, videos, animations, references (e.g., hyperlinks), frames, inputs (e.g., textboxes, text areas, checkboxes, radio buttons, drop-down menus, buttons, forms, etc.), scripts (e.g., JavaScript), and the like, including elements comprising or derived from data stored in one or more databases (e.g., database(s) 414) that are locally and/or remotely accessible to platform 410. Platform 410 may also respond to other requests from MNO system(s) 430.

In embodiments in which a web service is provided, platform 410 may receive requests from MNO systems 430, and provide responses in eXtensible Markup Language (XML), JavaScript Object Notation (JSON), and/or any other suitable or desired format. In such embodiments, platform 410 may provide an application programming interface (API) which defines the manner in which MNO system(s) 430 may interact with the web service. Thus, MNO system(s) 130 (which may themselves be servers), can define their own user interfaces, and rely on the web service to implement or otherwise provide the backend processes, methods, functionality, storage, and/or the like, described herein.

In an embodiment, platform 410 provides a suite of planning tools that enable participating MNOs to choose the mix of savings and user-experience improvements that align with their individual brand strategies. Studies have demonstrated that networks, participating in the disclosed cross optimization, can support up to twice the normal demand. Platform 410 adds a new domain to network optimization in terms of the frequency of adjustments and scope of its focus.

In an embodiment, platform 410 may use information from network planning systems (e.g., planning modules 432), calibrated by field measurements, to adjust existing parameters (e.g., in settings modules 434) on a periodic basis (e.g., daily, weekly, monthly, etc.). Applying these parameter adjustments across more than one mobile network creates unprecedented efficiency in utilizing all of the capacity within participating networks. The parameter adjustments may add neighbor cells from a partner network (e.g., network B) to specific cells (e.g., cell A1 in network A), and set their handover thresholds to achieve the optimal demand distribution. The neighbor relationships (e.g., the pair of networks A and B) and each demand transfer amount may be calculated based on region-wide network conditions and MNO preferences.

3. Potential Benefits of Cross Optimization

Cross optimization can be especially advantageous in dense urban areas, where MNOs tend to allocate continuous capital expenditures for additional network capacity. For example, cross optimization may enhance performance and user experience by improving one or more of the following:

- Cell loading, which may be improved by distributing data load more evenly across all participating cells. The cross optimization may employ otherwise idle capacity (e.g., reserve capacity 110) that has been built into networks for future demand growth.
- Signal quality, which may be improved by optimizing the signal conditions of mobile devices by connecting mobile devices to cells that can provide the best connection. Often times, the closest cell to a mobile device is one that belongs to a different network.
- Interference, which may be improved by the reduction in the level of interference resulting from better load distribution and better signal conditions for data transfers.

The disclosed cross optimization is fundamentally different from ordinary forms of active network sharing, in that it can preserve the relative competitive advantages of all participants. Participating MNOs can benefit from improved performance and efficient resource usage, while simultaneously maintaining their operating and competition strategies. For example, the MNO with the stronger network performance can retain its advantages and pricing premium over other MNOs, while still participating in the disclosed cross optimization with those other MNOs. The ability of platform 410 to maintain relative competitive advantages, results in the continuation of infrastructure-based competition. The participating MNOs are incentivized to continue improving their networks while benefitting from cross optimization. Therefore, cross optimization is well aligned with the objectives of national regulatory authorities. It also complements active network sharing and national roaming, which have been typically restricted to rural, coverage-limited areas by both MNOs and regulators.

In an embodiment, cross optimization transfers a portion of mobile devices between participating networks to optimize service delivery and network usage, according to MNO preferences. Service continuity in inter-system handover can be handled using existing interfaces and protocols of the 3GPP standard. Commercially, the MNOs can choose a "balanced" capacity exchange, where no payments between MNOs are necessary. It is also possible to specify an amount of wholesale capacity sold between MNOs at agreed-upon pricing.

Cross optimization functions in a new, previously untapped domain in the management and optimization of mobile networks. Until now, an MNO had two primary mechanisms to get the best performance at the lowest cost: (1) maintain the best possible structure and configuration of its network to meet subscribers' needs while keeping up with continuously growing data demand; and (2) use the best possible control systems in the real-time operation of its network.

Figure 5:
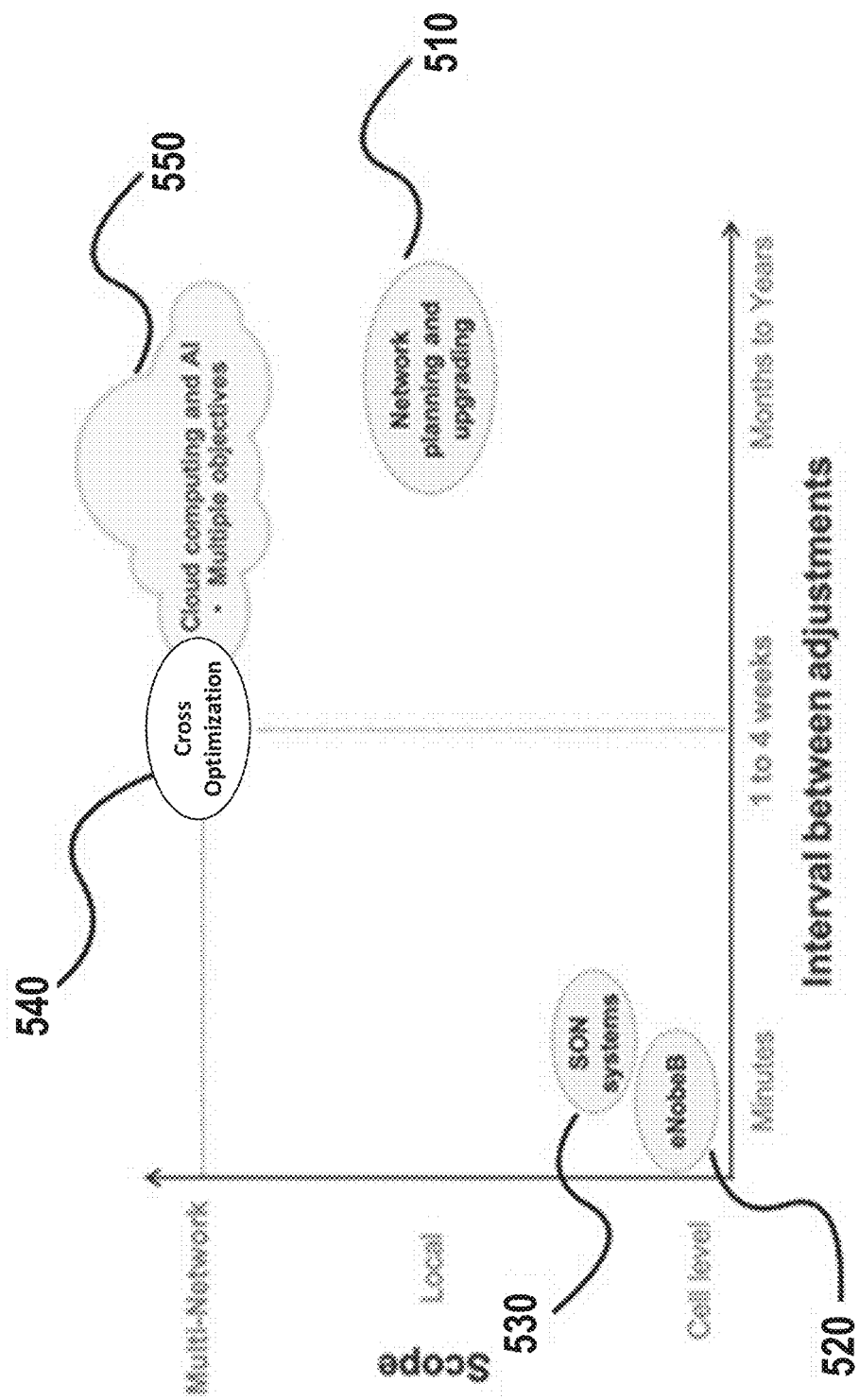
FIG. 5 illustrates disclosed processes as they relate to other tools, according to an embodiment.

These tools and their respective time/frequency-domains of operation are illustrated in FIG. 5. Network planning tools 510 (e.g., planning modules 432) are used to create accurate models and simulate various demand conditions. The models are fine-tuned with field data to provide the best support for decisions about network upgrades and for setting operations support systems (OSS) parameters. Typical planning cycles are three to six months, often driven by permitting and infrastructure considerations. The interval between changes or adjustments in any particular location can be years depending on the demand growth rate. On the other end of the time scale, feedback loops drive control actions in an eNodeB 520 within milliseconds, and self-optimizing network (SON) systems 530 make parameter adjustments in minutes based on changing conditions measured in real time. In other words, network planning tools 510 have the ability to handle a large number of parameters and have a broad geographic focus, but changes are infrequent and implementation of the results is slow. On the other hand, the control actions in eNodeB 520 and SON systems 530 are frequent, but are based on relatively few measurements in a small part of the network.

In an embodiment, cross optimization 540, as implemented by platform 410, adds a new domain to the management and optimization of mobile networks that is different in terms of scope and frequency of adjustments. Cross optimization 540 has a much broader scope than even network planning systems 510. Cross optimization 540 optimizes demand distribution across several networks, including, in some implementations, across networks of independent, competing MNOs. Cross optimization 540 can consider combinations of hundreds of thousands of variables, including the network choice of mobile devices in several networks across possible transceivers in different frequency bands in multiple networks. This adds completely new degrees of freedom to optimization and makes it possible to define new constraints and objectives. Because cross optimization 540 does not have to be constrained by the real-time feedback loops in eNodeB 520 an SONs 530, the optimization may be performed by powerful computing tools, including massive parallel cloud computing, which may utilize artificial intelligence 550 (e.g., machine learning).

In an embodiment, application 412 of platform 410 receives demand maps from MNO systems 430, and outputs changes and additions to standard mobile network operating parameters, such as neighboring cell lists and their associated CIO values. While this is a very narrow set of parameters, the total number of possible combinations across overlapping cells, potentially in multiple networks, is very large. Thus, application 412 may utilize massive computing resources to provide benefits in cost and performance.

Application 412 may perform its calculations based on a small set of key values that are available from network planning modules 432 of the MNO systems 430. Each planning module 432 may generate and/or maintain a planning model of a network, calibrated by field measurements. Thus, MNOs can study the network performance and load distribution improvements, provided by platform 410, using their own models, before implementing any parameter changes in their networks.

The disclosed cross-optimization approach enables the pursuit of several distinct objectives that may be mutually dependent. For example, application 412 can strive to limit the peak loads in a given region to a specified target value, and, at the same time, preserve the competitive differentiation that exists in the networks. In addition, application 412 can pursue both of these objectives while making sure that the same amount of data usage is transferred out of and into each participating network. Alternatively, if wholesale is desired, application 412 can pursue both objectives while making sure that the specified amount of net data usage takes place.

Regarding the frequency of control actions, platform 410 may operate in between the time domains of network upgrades and SON systems, as illustrated in FIG. 5. For example, in an embodiment, the re-optimization of demand distribution is carried out by application 412 every few weeks (e.g., every 3 weeks). This is more frequent than typical network configuration changes, but without the need for immediate real-time control of a feedback loop. Notably, even when the cross-optimization calculations of application 412 are only performed once a month, platform 410 can still address daily and weekly variations in demand patterns. Specifically, application 412 can optimize the demand and load distribution and the mobile device connection quality based on the situation during different parts of the week (e.g., weekday vs. weekend) and day (e.g., daytime vs. evening).

4. Demand Profiles

In a particular implementation, cross optimization is intended to reduce peak loads in a network during the busy hour. The demand map, described herein, may be built based on the longer term (e.g., two-week) average of measured PRB occupation or cell-level average throughput. In this case, the demand map reflects the average—and therefore, anticipated—distribution of demand during the busy hour. However, in a wider area, there are several different busy hours. For example, the demand is highest in city centers and office and workplace environments during the middle of the day on weekdays. In residential areas the busy hour is in the evening. Weekends and holidays have their own typical demand patterns.

Figure 6:
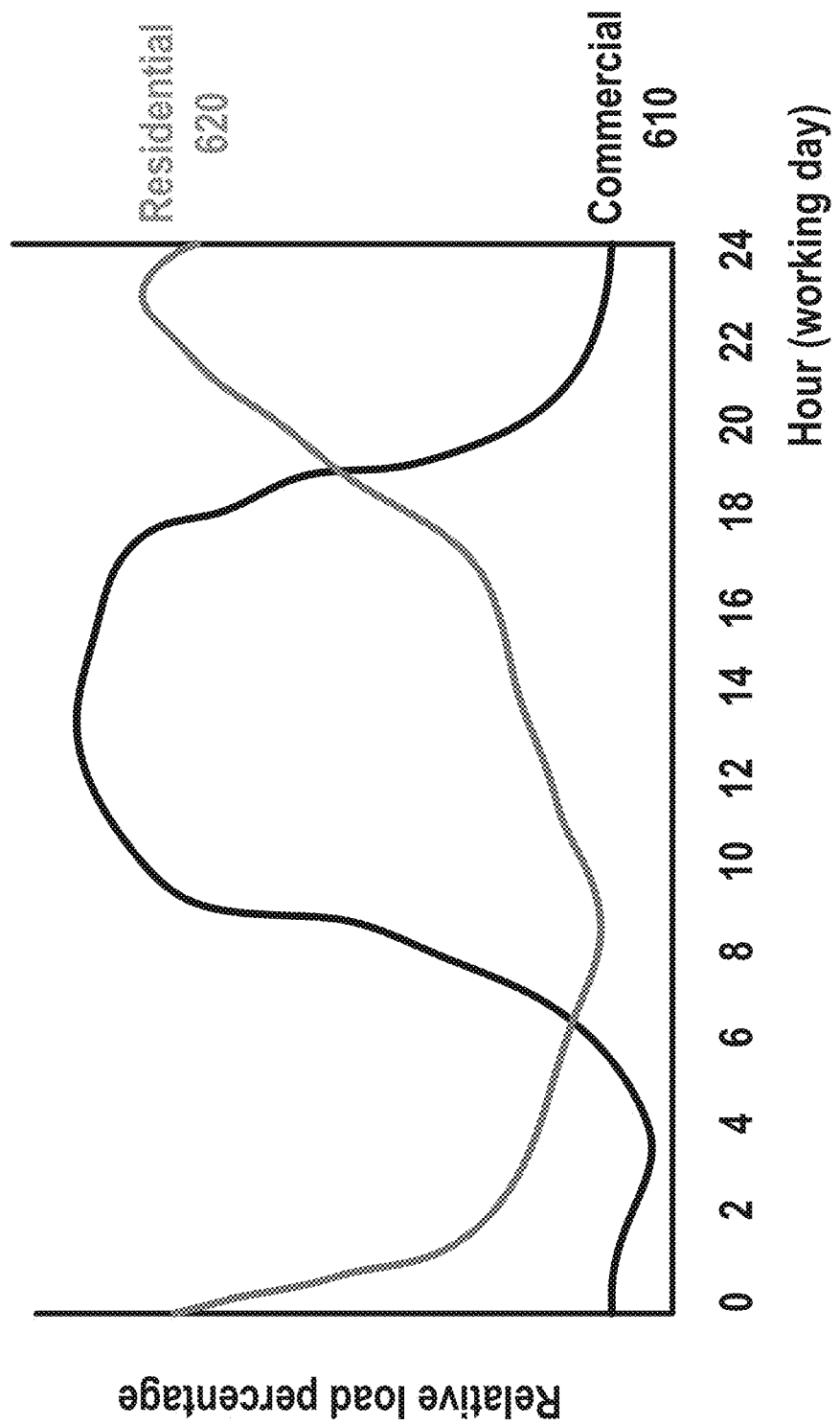
FIG. 6 illustrates example average load profiles.

FIG. 6 illustrates typical average load profiles in residential and office and work environments. As illustrated, the demand pattern 610 for a geographic area with mainly office and work facilities peaks during the working hours, whereas the demand pattern 620 in residential areas peaks during the evening hours. In most cases, the demand fluctuations, across various times of day and days of the week, represent a fairly regular, repetitive pattern. In addition, the steady increase in demand, over time, is superimposed on the regular variation pattern at a rate of, generally, a few percent per month.

In an embodiment, planning and simulation, which calculates the demand transfer parameters based on a calibrated demand map from network planning module 432, is normally repeated every month or so. This calculation can be done for each of the typical identified demand patterns. Each of these optimization cycles results in a set of demand transfer parameter settings. A set of these parameter settings for a particular busy hour demand pattern is referred to herein as a "profile" for the specified time interval of the busy hour.

In real-time operation, the parameter settings of the appropriate profile is applied, within the mobile networks of the participating MNOs, during the time of the identified demand pattern associated with those parameter settings in the profile. For example, regarding the regular weekly/daily demand fluctuations, there could be a period of a few hours in the middle of weekdays when a first profile for the mid-day of a workday is applied, and there could be a period in the evening when a second profile for the evening of a workday is applied. In other words, different parameter settings can be applied at different times of the day and/or during different days of the week.

Initially, cross optimization may only be applied for the single busiest period. However, over time, as demand grows without corresponding network upgrades, a more granular set of profiles may be set up. Platform 410 provides tools for analyzing demand patterns and creating and managing these profiles.

In addition to the predictable calendar-based busy-hour demand patterns, there can be other predictable fluctuations. For example, if there is an event venue, such as a sports stadium, concert area, or convention center in the network footprint, there will be a special demand pattern when large crowds gather for scheduled events at the event venue. Additionally, demand patterns may vary based on weather and seasons. Thus, in an embodiment, demand patterns and their associated needs for specific profiles, comprising specific demand transfer parameter settings, may be discovered utilizing information from network operations. For example, application 412 may store a regular feed (e.g., in database(s) 414) of actually experienced cell loads and throughputs from all participating networks (e.g., received from MNO systems 130). Application 412 may use this information to perform sophisticated analysis, using pattern recognition tools, including artificial intelligence (e.g., machine learning), for the purpose of recognizing repeated and predictable demand patterns, for example, to be used to generate new profiles.

In an embodiment, in the collection of the field data for the optimization calculation, application 412 may use averages for multiple occurrences of each repeatable pattern. Then, the planning and simulation model of planning modules 432 may also use these values, which correspond to the long-term, multiple occurrence averages. For example, if the optimization calculation is repeated every four weeks by application 412, the average demand level between 11:00 am and 4:00 pm on weekdays during the past month can be used as the demand level in the model when calculating the demand transfer parameters for the profile for that time period.

In an embodiment, the identification of a particular demand pattern that would benefit from a specific profile is done automatically, in real-time, based on measurements of operating parameters in the network. These parameters can be, for example, PRB occupations from counters in eNodeBs or average cell throughput values. These values, or the conclusions about patterns derived from these values, may be collected from participating networks by application 412, and a coordinated switch from one profile to another can be executed automatically by application 412. This can be done, for example, by a message from the platform 110 to the settings modules 434 of the MNO systems 430 of the affected networks.

5. Details of Cross Optimization

To summarize, an embodiment of the disclosed cross optimization involves arranging access to two networks (e.g., separate networks, or separate network layers within the same network) that operate on separate frequencies and have partially overlapping coverage maps of best service, resulting from differences in cell sites or sector orientation or characteristics, wherein the network layers have different percentage load distributions across the cells in their geographic coverage area, and adjusting the load distribution or other operational characteristics of the two networks or network layers by selectively transferring connections of mobile devices served by each network to the other network in at least some partial overlap areas, utilizing standard cellular-network RRC reconfiguration message parameters.

Figure 7A:
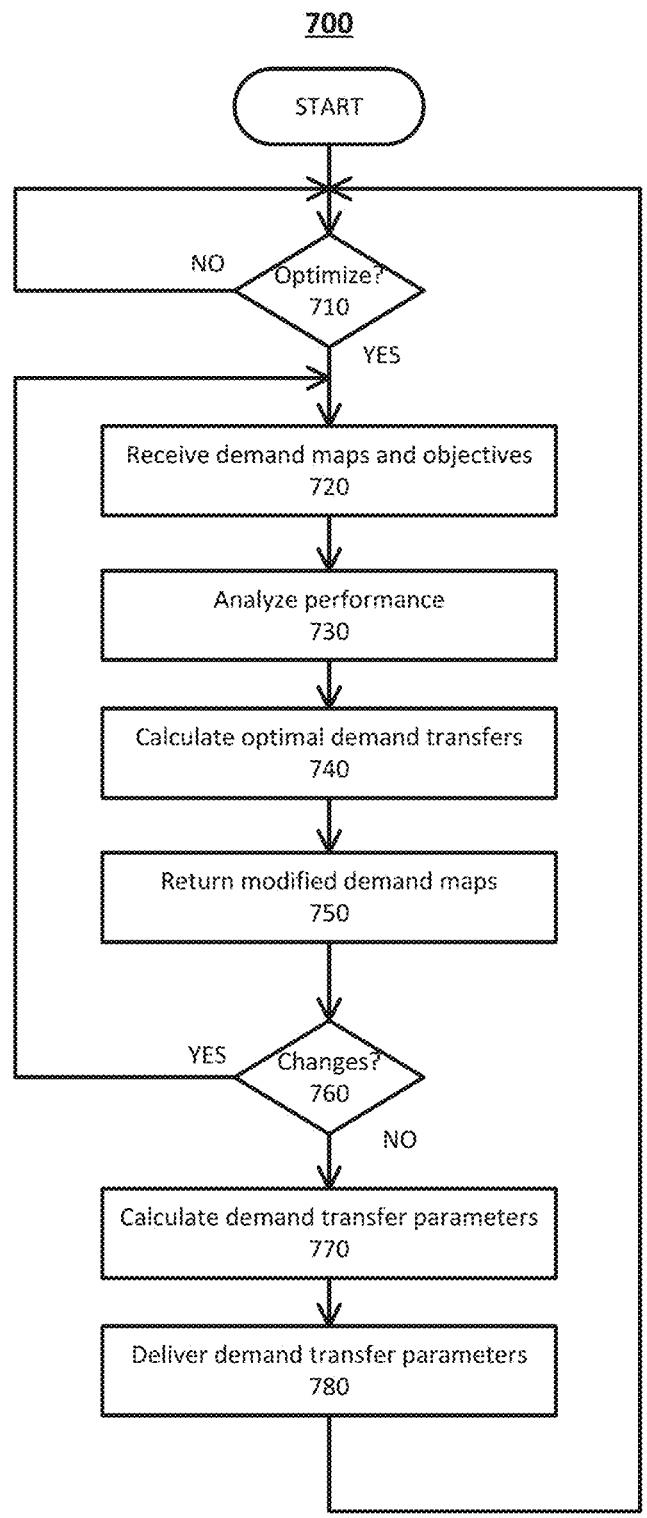
FIGS. 7A and 7B illustrate an example process for cross optimization, according to an embodiment.
Figure 7B:
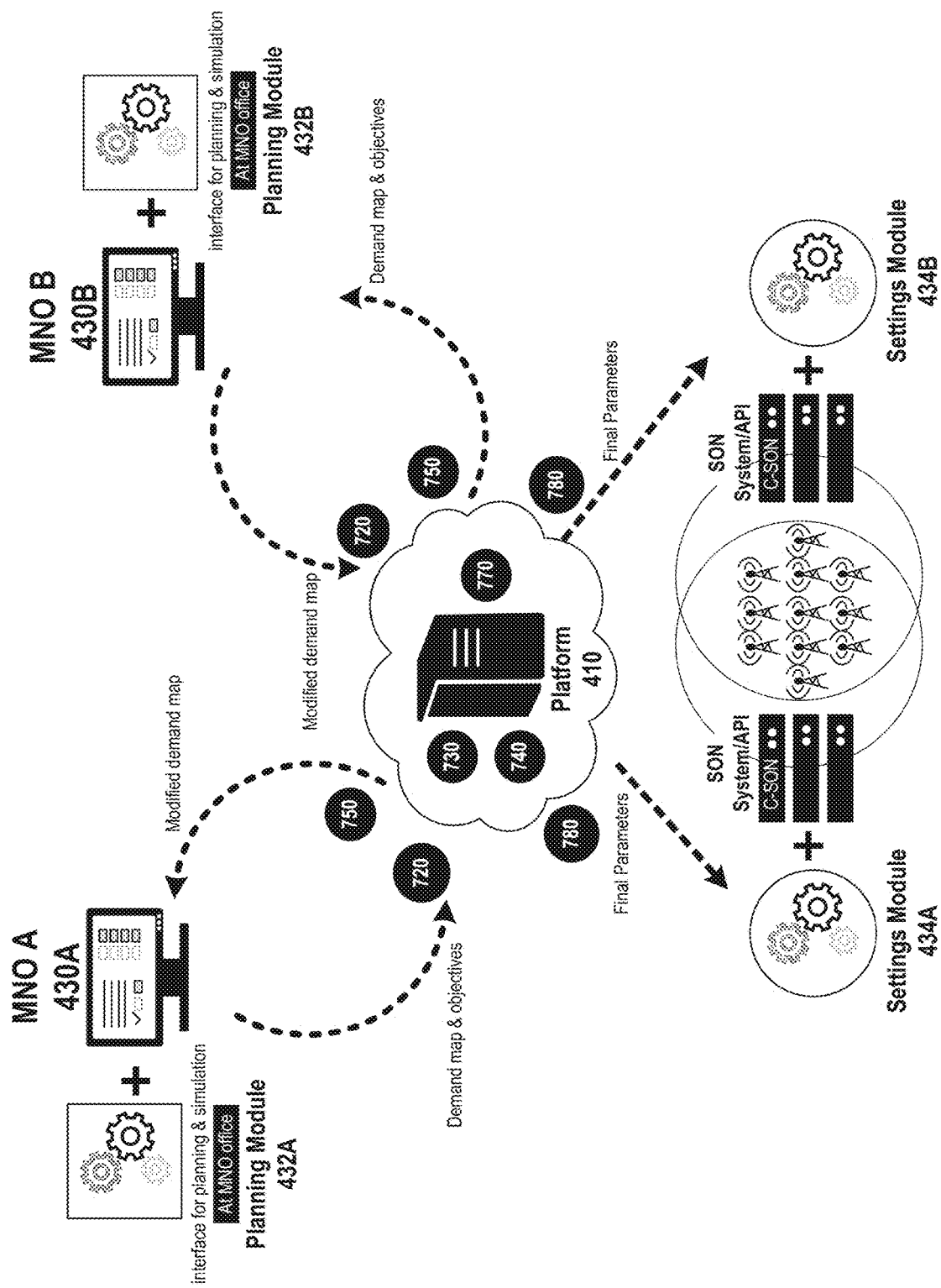

In an embodiment, cross optimization comprises two major steps: (1) planning and simulation; and (2) real-time operation. FIG. 7A illustrates an example process 700 for cross optimizing two or more networks, according to an embodiment. Cross-optimization process 700 may be implemented by application 412 of platform 110. FIG. 7B illustrates the data flow in process 700 between infrastructure components, according to an embodiment. While cross optimization is being described herein with respect to two networks A and B, it should be understood that the same processes and data flows may be applied to three or more networks, and more generally, any plurality of networks, including any plurality of network layers.

In step 710, application 412 determines whether or not to perform an optimization. For instance, optimization for a particular set of networks may be performed periodically (e.g., every week, every few weeks, every month, etc.). Alternatively or additionally, the optimization may be performed in response to a specific request (e.g., from one or more MNO systems 430, a user request via a graphical user interface generated by application 412, etc.). If optimization is to be performed (i.e., "YES" in step 710), application 412 proceeds to step 720. Otherwise (i.e., "NO" in step 710), application 412 continues to wait to perform the next optimization.

During planning and simulation, each of the networks to be optimized may be modeled and simulated, for example, using a planning module 432 of an MNO system 430. Planning module 432 may comprise any standard network planning tool. Examples of planning module 432 include, without limitation, the Atoll™ wireless network engineering software by Forsk S.A.S. of Blagnac, France, Planet™ by Infovista Corporation of Ashburn, Virginia, Asset™ by Teoco of Fairfax, Virginia, and the like. A planning module 432 can be used to generate, for each participating network a model that represents the network topology, location and direction of transmitters and antenna types, terrain, physical environment, and buildings (e.g., through a mechanism called clutter classes), mobile devices and their data traffic, and various network control mechanisms.

The network models of planning modules 432 can be used to generate a demand map that corresponds to the current network load situation in each of the participating networks. Network planning tools typically have a Monte Carlo and/or other simulation mechanism that can generate a distributed set of mobile devices in the model. In this manner, a fixed map of mobile devices is generated across the territory to be optimized. The generation of this map can utilize information about the environment, as represented, for example, by clutter classes.

Next, a set of services may be defined for the mobile devices in the map to create the demand map. The set of services describe the data demand patterns of the mobile devices. A particularly useful way of handling the services is to define an average data demand for each mobile device which will be required by that mobile device for the entire time period of the simulation. This allows for a simple representation and the calculation of average cell loads and average connection parameters in the model. These services can be used to calibrate the demand of the modeled mobile devices so that the load represented in the demand map corresponds to the actual average load levels in the networks to be optimized. The actual measured performance data, together with the modeled and simulated performance, is used to generate the demand map, such that that the demand map is representative of the actual conditions under which the associated network operates.

Next, the fixed demand map (from the models of each participating MNO) for each participating network and frequency band may be used to carry out a detailed network performance simulation using planning modules 432. To explore the effects of future demand levels, the demands in the services used in the fixed mobile device distribution on the demand map can be varied. For example, the growth percentage of mobile peak power demand in the territory to be simulated can be used to analyze the potential of cross optimization for handling the growing demand in future years with fewer network investments.

Using the results of the simulation, the variables describing the signal conditions for each of the fixed subscriber mobile devices in the demand map as well as the actual serving cell identifications can be extracted from the output of the network modeling simulation. These variables, together with the demand map subscriber identification information, may then be transferred to the optimization process, implemented by application 412.

In an embodiment, the data to be transferred to the application 412 is extracted from a standard planning module 432 (e.g., using an export function or a proprietary client application) and sent to application 412 of platform 410. The data to be transferred as a demand map may include one or more of the simulated values of the following parameters: the average demand (e.g., in Megabits per second (Mbps)) across an hour for each point on the calibrated demand map, location (e.g., longitude and latitude, for example, of the Global Positioning System (GPS)) of each modeled mobile device, best-server identifier, peak channel throughput (PCT) (e.g., downlink in Mbps), signal-to-noise ratio (SINR), reference signal received power (RSRP), and/or the like. Simulation results for PCT, SINR, and/or RSRP may be provided in a map grid format that includes the best-server identifier for each point, to enable establishment of the available peak channel throughput and the signal quality and serving cell at any location in the area. In this implementation, there is no need for any geographic or other topology or structural information about the networks. This extraction of data can be carried out for all of the frequency bands of all participating networks of all MNOs, and uploaded to application 412.

In step 720, application 412 receives demand maps for the networks to be optimized and one or more objectives for the cross-optimization. For example, for each participating network, the planning module 432 of the MNO system 130 for that network provides a demand map to application 412. Each demand map may comprise a location for each modeled mobile device, the SINR for each modeled mobile device, a unique identifier for the serving cell of each modeled mobile device, and/or the like. MNO systems 130 may also provide one or more objectives, targets, or preferences to application 412. For example, these objectives can represent target values that may be used to constrain the cross optimization, or may represent other constraints (e.g., a requirement to keep the overall performance differences between the networks the same, a requirement to keep the demand transfer balanced or to a desired amount of wholesale, etc.).

In step 730, application 412 analyzes the initial performance of the participating networks, based on the received demand maps, to obtain one or more parameters for the optimization process. For example, if one of the objectives, received in step 720, is to maintain the relative performance differences between networks, application 412 may analyze the relative performance differences in the various participating networks or combinations of networks (e.g., frequency bands) belonging to each MNO. This is done for the purposes of establishing the relative competitive differences between participating MNOs, so that this information can then be used to set the constraints for optimization.

In step 740, using the demand maps and objectives received in step 720 and the parameters obtained in step 730, application 412 transfers the modeled mobile devices in the fixed demand maps for networks A and B between a serving cell in network A and a serving cell in network B to improve the load conditions in the networks A and B towards the set objectives. Objectives for variables, such as network speed or speed distribution, can also be used in determining which mobile devices in the fixed demand maps are transferred between networks A and B.

Another separate but possibly related and dependent constraint that may be imposed on the optimization calculation concerns the amount of actual data capacity used by each MNO from the networks of other participating MNOs in a select period of time. It is possible to balance the transfers, so that the total amount of data capacity each MNO receives (uses) from other MNOs during a period (e.g., during a calendar month) is equal to the total amount of data capacity other MNOs receive (use) in their network. In this manner, the whole exchange can be considered a barter in which each MNO gives up underutilized capacity and receives much needed capacity to relieve load in their highly loaded cells. Alternatively or additionally, a specified amount of net data capacity transfer can be specified as a constraint for the optimization. This enables wholesale of underutilized capacity between MNOs.

As discussed above, each MNO may provide its own specific objective(s) and/or constraint(s) for the cross optimization. The key parameters for these objectives may include, without limitation, one or more of the following:

- Load level targets for each area in the network. For example, each MNO can set the peak load percentage that should not be exceeded by more than a few cells. This limit is normally a key parameter in the MNO's existing policies and practices for deciding about network upgrades.
- Locations and time. Each MNO can specify the area of the network and the times of day and week during which they would like to optimize network performance. The benefits are higher during times and in areas in which two or more MNOs participate.
- Whether selling or buying is acceptable. If wholesaling of capacity is not desired, application 412 may optimize demand transfers in a way that the amount of data usage removed from and added to each network is balanced. In this case, MNOs effectively trade capacity from the underutilized parts of their networks for capacity in areas where they have a high load and can benefit from additional capacity.

In an embodiment, if no wholesale is included, application 412 calculates the demand transfers in a way that preserves the initial relative performance differences between the participating networks. For example, if there is initially a 10% difference in the overall network load levels, application 412 ensures that the same 10% difference remains after optimization. In other words, the demand in all participating networks is redistributed to eliminate high peaks and reduce overall load levels, but in a way that still maintains the initial relative 10% difference. The specific metrics to define and maintain competitive differentiation may be defined jointly among the participants. Notably, keeping the relative performance differences the same as they would be without cross optimization means that the peak load level reduction actually realized for each participant may be different from the target value requested by each participant. The relative improvement for everyone will be the same unless an agreement about wholesale and associated payments for the resulting additional improvement is in place.

Notably, in the event that the participating networks are owned by different MNOs, it is not necessary for either MNO to disclose anything about its actual network topology or structure during the planning and simulation stage. Even the serving cell identifiers can be any made-up or random numbers or strings, as long as they are consistent and unique across the dataset. This may be an important consideration in case the two networks belong to MNOs that may be competitors in providing mobile services. The modeling of each respective network can be performed by separate personnel or contractors hired by each individual MNO.

In step 750, application 412 returns modified demand maps, representing new network allocations for the modeled mobile devices on the demand maps to the planning modules 434 for each participating MNO system 430. In other words, upon completion of the cross optimization by application 412, the revised demand maps may be returned to each of the network models. In these maps, the fixed subscribers' mobile devices may have been transferred between the two networks. In some locations of the original demand map, there may now be multiple mobile devices with their respective services, and in other locations, there may not be any mobile devices. These demand maps can be fed back into the network models to simulate and examine the load distribution and other network performance parameters in this optimized mode of the network.

This cycle of modeling, optimization, and simulation can be repeated to find the objectives and the optimized solution that best satisfies the goals set for the participating networks. Specifically, in step 760, application 412 determines whether there are any changes to be made to the optimizations performed in steps 720-750. For example, a particular MNO may not be satisfied with the modified demand maps or achievement of the objectives, or may have changed objectives. If changes are requested (i.e., "YES" in step 760), another iteration of steps 720-750 is performed with new demand maps and/or objectives. Otherwise, if the MNOs are satisfied with the optimization (i.e., "NO" in step 760), application proceeds to step 770.

In an embodiment, application 412 also returns information to each MNO system 430 about the predicted user experience metrics for all of its mobile devices, including the mobile devices that will be connected to other networks following optimization. This gives each MNO the complete predicted experience of all of its subscribers.

After the optimization, there will be a new demand map for each of the networks A and B. In step 770, based on these demand maps and the established need for transferring mobile devices from one network to the other network in each of the partial overlap areas, as illustrated in FIGS. 3A and 3B, the network parameters for accomplishing the desired transfers can be calculated. In an embodiment, the CIOs are utilized to select which mobile devices from each partial overlap area in one network are transferred to the other network. This selection process is described in more detail elsewhere herein.

Figure 8:
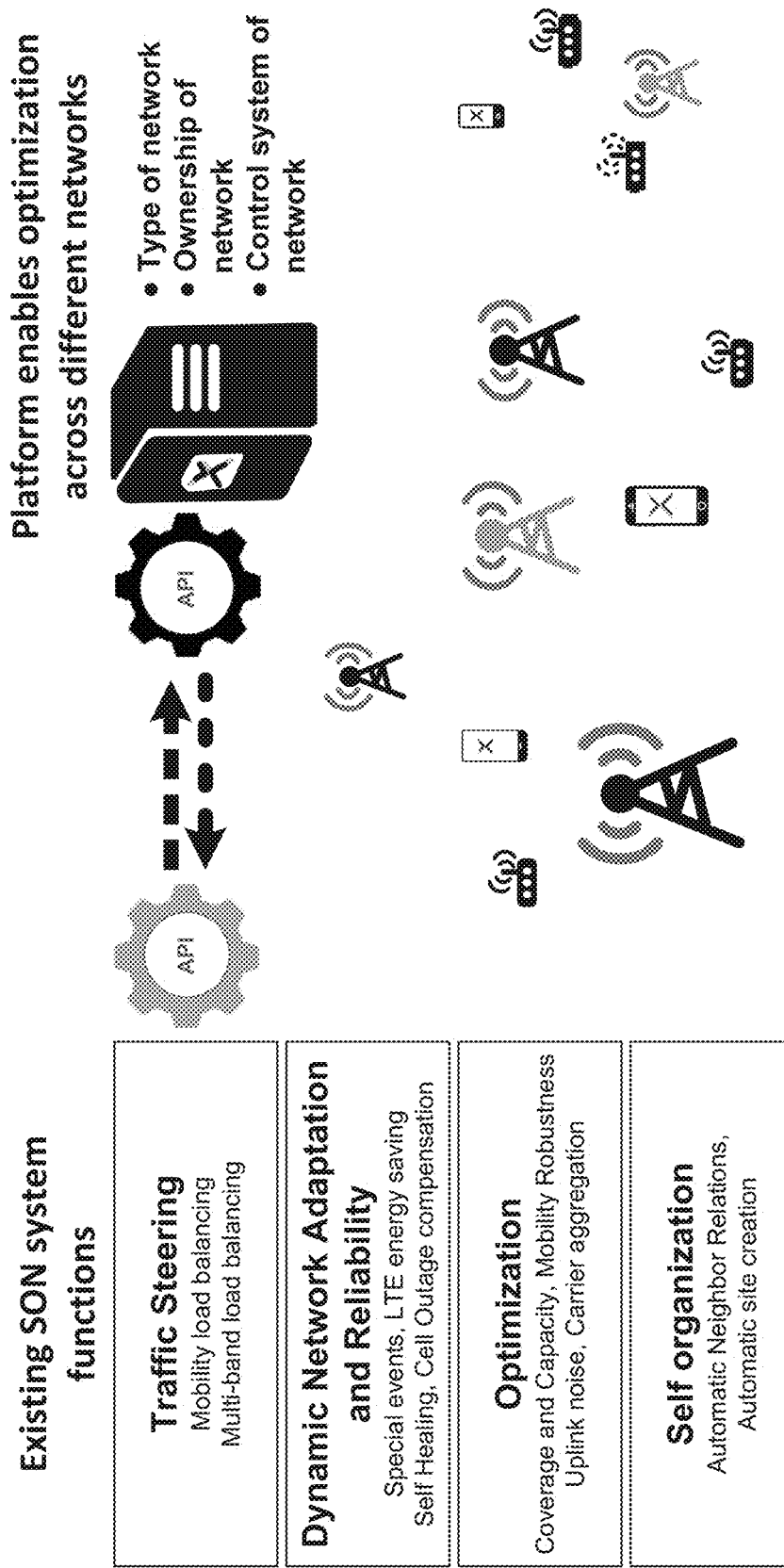
FIG. 8 illustrates an infrastructure for adjusting parameters, according to an embodiment.

In step 780, application 412 delivers the necessary demand transfer parameters for controlling the network to settings modules 434 of the MNO system 130 of each participating MNO, to be used in the real-time operation of their networks. In an embodiment, the implementation of these parameters in the real-time operation of the networks is accomplished through SON systems, which already handle similar parameters for management and optimization within each network separately. In other words, application 412 may deliver the demand transfer parameters through an API of a SON system, as illustrated in FIG. 8, according to an embodiment. Notably, the functions of platform 410 extend into the current SON systems and the existing network control systems, in networks that are within its scope of optimization, by adding or changing the parameters that these systems use.

As discussed above, many mobile network control systems already have sophisticated internal load-balancing mechanisms. One example is the network-control mechanism described in the 3GPP (ETSI) standard for cellular networks. Additional optimization functions are available in the various SON systems. Platform 410 takes advantage of these existing widely deployed mechanisms, and adds a layer of optimization that may include trade-offs of value across boundaries between networks and sets of mobile devices. This added layer of optimization may also be extended to actual commerce and trading of access to network resources or local data transfer capacity between network and mobile service providers.

The cross optimization of platform 410 also introduces a different time domain and scope to the network control and management, as illustrated in FIG. 5. Considering the ability to use different profiles that are based on averages of demand patterns measured over several occurrences of regularly occurring events, this cross optimization can be characterized as applying broad-based optimization control to the "harmonics" of the variations in demand patterns. On one level, the periodic (e.g., weekly or monthly) recalculation based on averages implements a feedback loop control system through the planning modules 432 and cross-optimization calculation that has, for example, weeks as its typical time constants. On another level, the switching to relevant profiles based on predictable occurrences of various situations provides the ability to exercise long-term control on different events that may occur on the time scale of hours or less and a repeat pattern of days, weeks, or at other predictable or detectable times.

Figure 9:
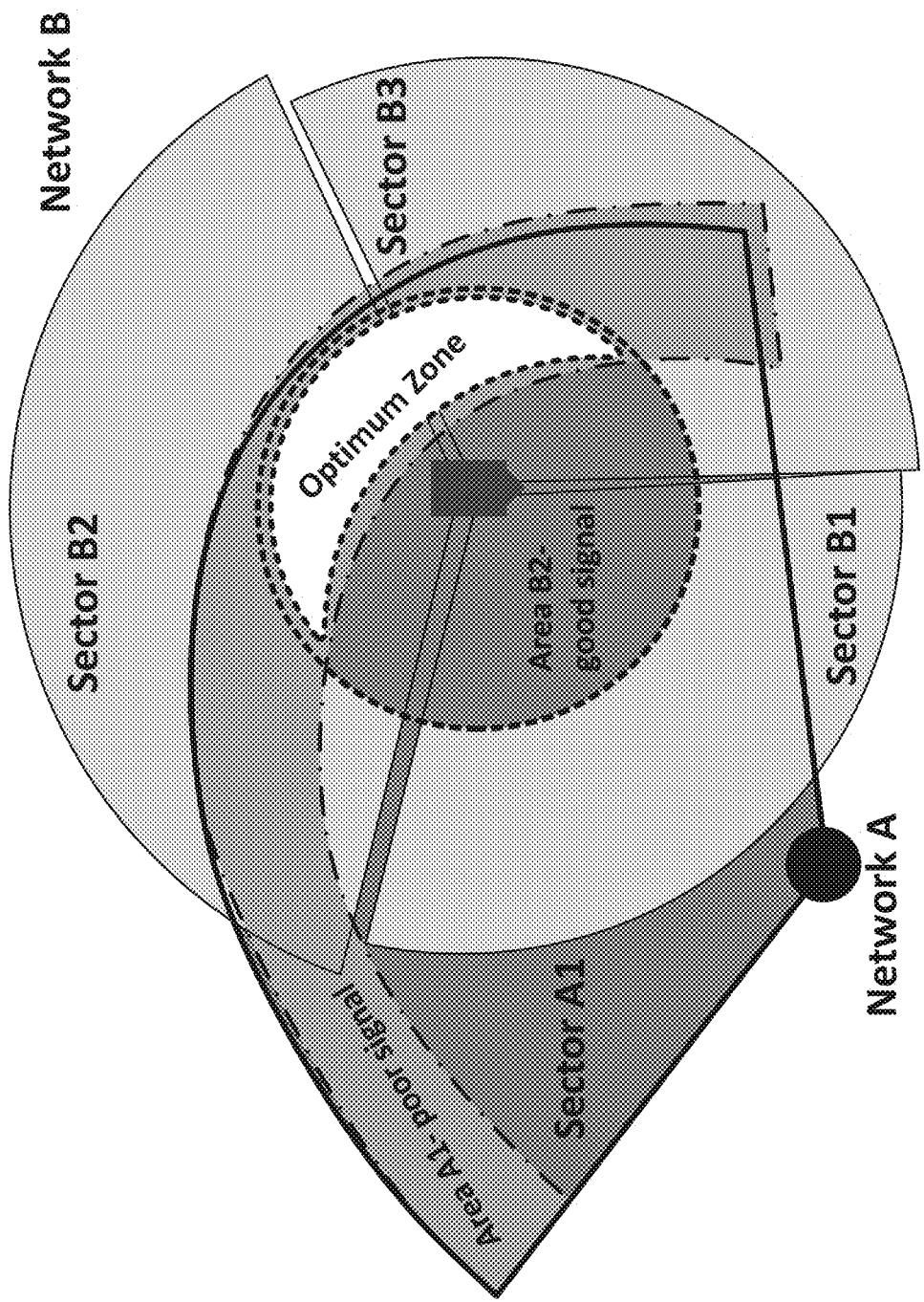
FIG. 9 illustrates overlapping networks, according to an embodiment.

Objectives for optimum selection of roaming devices, when seeking to balance load across cells in the most economical way, will now be discussed. FIG. 9 illustrates the detailed situation in two overlapping networks A and B, according to an embodiment. For the purposes of discussion, it is assumed that the load in cell A1 is higher than desirable, such that the user experience of mobile devices connected to cell A1 has deteriorated. User experience and the average data transfer speed in a cell depends on the average load level. The higher the load level, the lower the average speeds. In this sense, there is "value" to decreasing the load in cell A1, since the average user experience will improve. A monetary manifestation of this value can be seen in the network capacity upgrade investments made by the mobile service providers that operate and maintain their own networks.

Speed and user experience are worst at the edge of cell A1 in area A1, since mobile devices in this area have the poorest signal. As mentioned earlier, the distance of a mobile device from the cell site is being used to indicate the quality (throughput) of a connection, which in the real world is closely related to physical distance. Notably, devices in area A1 are also the most "expensive" to serve in terms of network resources, since they have slower connections and getting the same amount of data to them takes up a higher amount of time and network resource blocks than devices that are in good signal conditions. The difference in an LTE network can be up to fifty-fold, and in many network implementations is routinely more than twenty-fold between the center and edge of a cell. When multiple input, multiple output (MIMO) is used, the difference may be even higher. Thus, removing the load of mobile devices in area A1 would provide the most effective relief of the load in cell A1, because the data needs of these mobile devices are the most "expensive" to satisfy in terms of radio resources. In other words, these mobile devices consume more resource blocks per megabyte of data transfer.

The illustration in FIG. 9 simplifies the situation for purposes of clarity by assuming that the signal quality—and, therefore, the data transmission efficiency—depends only on the distance from the antenna. In reality, other factors, such as the terrain, buildings, the specific location of the mobile device, the antenna, and the radio frequency (RF) front end of the mobile device, have an impact on the signal quality (e.g., the signal-to-noise ratio). Therefore, it should be understood that, in reality, the area A1, representing the poor signal quality in network A, is determined by the actual signal quality, rather than simply the distance from the antenna.

As illustrated in FIG. 9, network B comprises three cells B1, B2 and B3. Considering that the signal fades with distance, there will be a good signal area in the vicinity of the cell antennas. This is shown in FIG. 9 as area B2. In accordance with the simplified manner of illustration, area B2 is approximately a circle with the cell antenna located in the center of the circle. This assumes that the transmission powers and antennas and their tilt angles in each of cells B1-B3 are identical. Again, it should be understood that, in reality, the area B2, representing the good signal quality in network B, is determined by the actual signal quality, rather than simply the distance from the antenna. This good signal area B2 represents the part of the cells B1-B3 in which the efficiency of serving mobile devices is at its highest. A good signal corresponds to better encoding and faster speeds with fewer resource blocks (in LTE protocol) needed to provide a given amount of data transmission.

Considering a situation in which cell A1 is at a load level that is higher than desirable and cells B1-B3 are at load levels at which additional load would not cause an unacceptable decline in user experience, it would be desirable to move the connections and thereby the associated load of some mobile devices in cell A1 to cells B1-B3. To be more precise than just referring to a "higher than desirable" load or an "acceptable decline," there is a value and a cost associated with every incremental change in load. There is a complex non-linear relationship between load and network performance, and the value of incremental speed is also non-linear.

Usually, the service of a mobile device, whose "home" is on network A, on a "visited" network B is done for coverage reasons (e.g., when network A cannot provide an acceptable signal). In this case, it is said that the mobile device "roams" on network B. Roaming is done for load balancing and for the purpose of using existing resources more efficiently. Roaming between networks that belong to different MNOs may sometimes be referred to as "economic roaming."

Considering the specific resource efficiency described above, it can be concluded that the most resource-economical way of achieving the load reduction in cell A1 (and creating value) would be to move some of the mobile devices with a poor signal in area A1 away from cell A1, and allow those devices to be served by network B. This would create the maximum load reduction (and value) in relation to the number of transferred connections and total data demand served by network B.

To further optimize this scenario, the subset of mobile devices to be transferred from network A to network B should be those mobile devices that can have a good signal on network B. This would result in the absorption of the additional data transfer need with the minimum increase of resource load (cost) in network B, since the demand from mobile devices with a better signal can be served with fewer resources. As can be seen in FIG. 9, this would be the mobile devices in the area that is an intersection of areas A1 and B2. This area is labeled "Optimum Zone" in FIG. 9.

It is possible for cells B1-B3 to have different load levels. Therefore, the incremental load from mobile devices coming from network A may have a different effect on the user experience in each of cells B1-B3. This can be thought of as a different "cost" for the target. Cost in this context can be thought of as an adverse effect on the users of mobile devices in network B, since most of the actual cost of the networks and their operations are fixed costs that are not affected by the load. In this case, the optimal distribution of mobile devices from network A in area A1, between cells B2 and B3, would be different. The signal level in network B, at which it would be best to receive a roaming device from area A1, would also be different for cells B2 and B3. It is even possible that cell B1 would be the best cell to receive some of the mobile devices in cell A1, if the load in cell B1 is much smaller than the loads in cells B2 and B3. As used herein, the term "signal level" can mean any available signal parameter that indicates the quality or strength of the connection that can be achieved. Examples of such signal parameters include, without limitation, signal-to-noise ratio (SNR), signal-to-interference-plus-noise ratio (SINR), channel quality indicator (CQI), reference signal received quality (RSRQ), reference signal received power (RSRP), and received signal strength indicator (RSSI).

As discussed above, the concepts of cost and value, in the sense of a change in the network speed experienced by mobile device users, have direct financial counterparts. This is evidenced by the network investments made to maintain acceptable load levels in wireless networks. In reality, the relation of network load reduction, through cross optimization, to the actual financial value is quite complex. First, the relationship of network load to the average speed experienced by mobile devices is non-linear and complicated. Therefore, the value of incremental changes inherently depends on the existing load levels. Second, economic roaming can be seen as an alternative to a network capacity upgrade. The cost of the upgrade depends on a number of factors, such as the availability of additional spectrum, local factors like availability of cell sites and cost of backhaul, and/or the like. Furthermore, the value of maintaining a good user experience may vary across different network user groups or locations.

6. Controlling Network Selection of Mobile Devices

In an embodiment, the mechanics of a connection transfer, resulting from cross optimization, can be thought of as an extension to the set of normal handovers that take place when mobile devices move through an area covered by several cells, or when the load needs to be balanced between different parts of the network across RAT boundaries or frequency-band boundaries. The parameters for the handovers may be adjusted, according to the cross optimization by application 412, by adding specific changes to the handover instruction parameters used in normal network operations.

Figure 10:
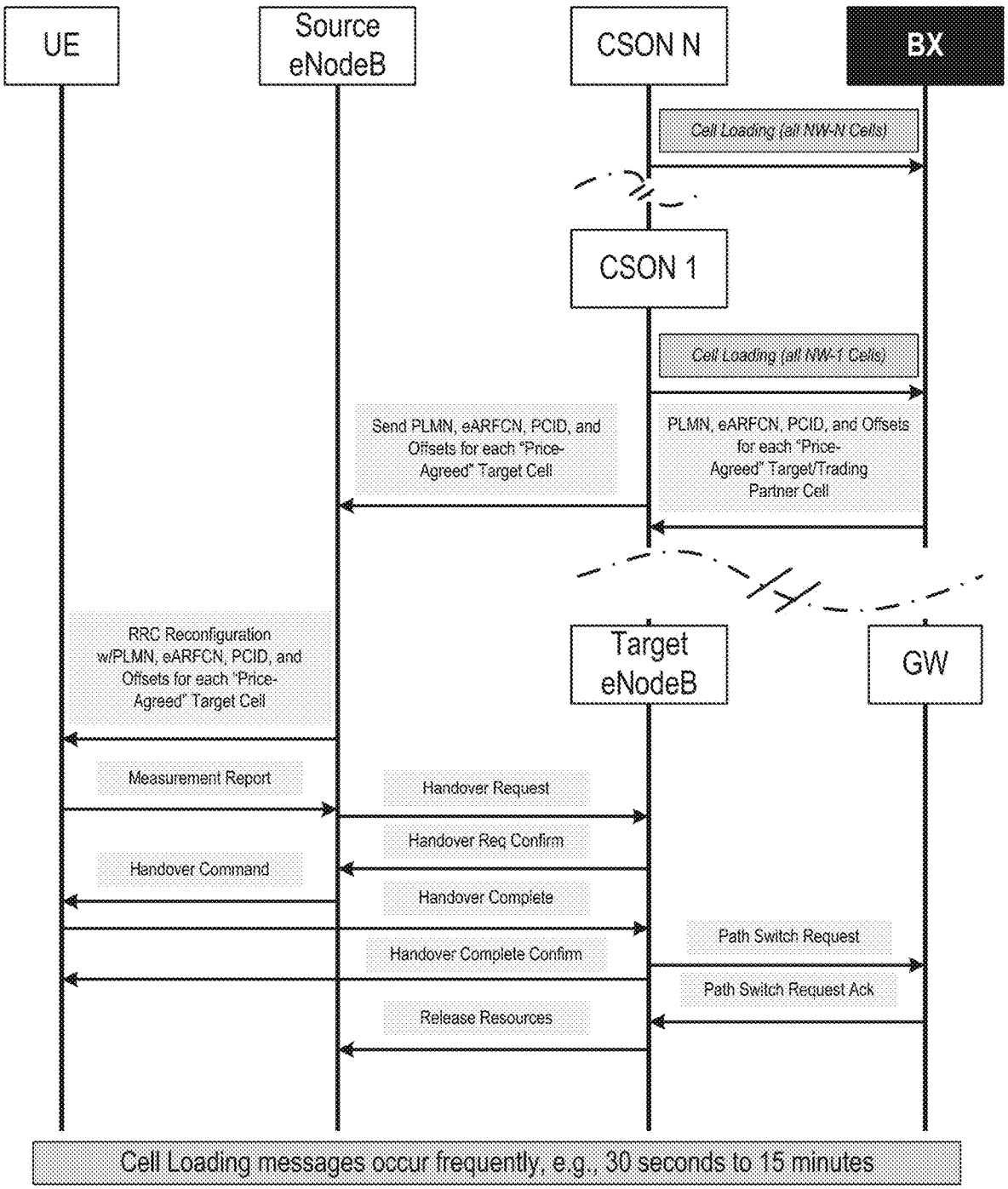
FIG. 10 illustrates an example of a call flow in a network handover scenario, according to an embodiment.

FIG. 10 illustrates an example of a call flow in a network handover scenario, along with the key interfaces and actions that the cross optimization utilizes to achieve the optimum load distribution across two separate networks, according to an embodiment. The disclosed system has the ability to alter typical single-network handovers to support multi-network handovers by monitoring the network load and performance at the cell level. These parameter changes, initiated by platform 410 (e.g., via delivery in step 780), may include, without limitation, measurement offsets and system and cell identification information of the other network (or layer) that participates in the cross optimization. Control parameters include, for example, sector/cell loading, commonly represented by PRB occupation or transmission time interval (TTI) utilization.

In an embodiment, the parameter changes may be implemented via an interface with SON equipment. Alternatively, platform 410 process may communicate directly with the network management systems of the participating networks or the entities which contain loading information for the participating networks. In either case, an interface (e.g., settings module 434) for providing the parameters changes is provided between application 412 and the SON equipment or other network management system.

In the embodiment in which platform 410 is interfaced to SON equipment, application 412 may utilize a specific application programming interface (API) and function as a "plug-in" piece of software which provides additional functionality to the SON systems of each participating network. This API enables application 412 to receive loading information and other key performance indicators (KPI) from participating networks. In this case, platform 410 would directly interface with SON equipment.

7. Example Implementation

In an environment in which platform 410 is connected to two or more LTE networks, the participating networks would offer their loading information in frequent intervals to application 412. As discussed elsewhere herein, application 412 may be located in a data center (e.g., in the Cloud). Alternatively, application 412 may at least be partially located in one or more of the MNOs' premises (e.g., application 412 may comprise both server-side and client-side modules). This loading information is input to application 412, which processes the loading information from the plurality of networks, to produce a result. The result of the algorithms of application 412 is a parameter change instruction (e.g., step 780) that will go to the native network cells. The parameter changes may comprise, without limitation, Public Land Mobile Network (PLMN) code (e.g., a combination of the Mobile Country Code (MCC) and Mobile Network Code (MNC), which uniquely identifies the Mobile Network Operator), and Physical Cell Identity (PCID), which identifies a cell, or Global Cell Identity (CGI) of the partner network, as well as CIOs for the new neighbors (e.g., via a Radio Resource Control (RRC) Reconfiguration message and/or various System Information Blocks (SIBs)). The parameter changes may also include changes in the A3-offset cell and event A2 thresholds. The parameter changes may also include hysteresis, filter coefficients, time to trigger, and/or other handover parameters.

In a real mobile network, mobile devices move around, and individual connection parameters change over time. Also, load levels and data demands change with time. To provide an opportunity to constantly adjust the optimization, regarding which mobile devices are connected to the primary or home network or various cells of the visited network(s), a mechanism may be provided to steadily return a stream of mobile devices from the visited networks back to the primary network. This way, there will be a continuous stream of optimization decisions regarding the transfer of connections to the visited network(s), and these decisions will take into account the changing parameters. Since the load conditions are measured frequently (by the SON system or network management system) and these updated parameters are used in making subsequent transfer decisions and parameter adjustments, there is a feedback loop from the effects of optimization to new optimization actions. This provides stability, and facilitates the objectives of platform 410.

Some of the parameters in the RRC reconfiguration messages sent to mobile devices entering each cell in a mobile network are used for intra-network handover management, and can be adjusted by a SON system to do automatic load balancing between neighboring cells. Therefore, it is important that any changes to these parameters, made by application 412, are made in a way that does not adversely affect these functions. Of course, the parameters relating to the cells in network B are not used for any purpose other than managing intra-network traffic. Therefore, application 412 can set these parameters without being concerned about affecting internal functions of network A.

The offset parameters for new cells in network B should be included in the first messages to mobile devices in network A entering overlap areas. For example, normally including the PLMN and the PCID of cell B1 without any offset values would result in a number of mobile devices from cell A1 initiating handovers to cell B1 instead of other neighboring cells in network A. This is because the signal strengths close to the cell site of cell B1 in network B may be much higher than the signal levels in the cells of network A that neighbor cell A1. Normally, a handover process is initiated when the signal of the serving cell drops below the signal in the neighboring cell, wherein both signals are adjusted using the offsets (i.e., the A3 offset and the CIO for the neighboring cell).

Figure 11:
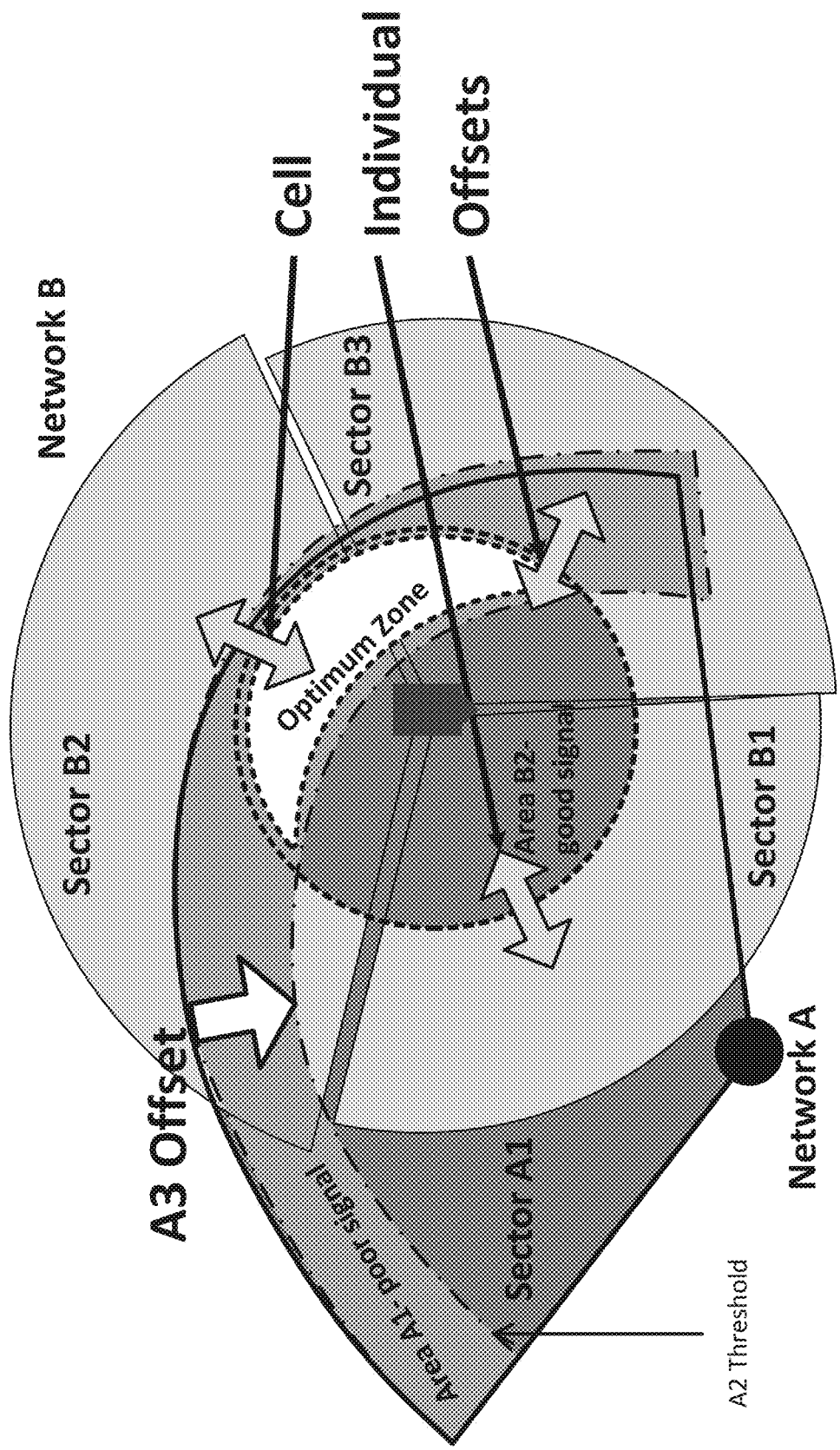
FIG. 11 illustrates parameters that may be adjusted for cross optimization, according to an embodiment.

By including a large negative offset as the CIO for all of the cells in network B that are included in the updated configuration message transmitted by network A, the number of handovers initiated from network A to network B can be limited. It may be possible to also control the number of handovers by setting the so-called Event A2 and A1 thresholds. Setting these thresholds can limit the number of devices that engage in the measurement and signal comparison for handover initiation purposes in the first place. FIG. 11 illustrates the various thresholds and offsets, using the example from FIG. 9.

When the CIOs of cells in network B are adjusted up from the initially high negative value (e.g., for LTE the CIO range is −24 dB to +24 dB), the number of mobile devices for which the offset-adjusted signal level comparison triggers a handover to network B will increase. By controlling these CIOs, application 412 can control the amount of traffic that will be moved from each cell in network A to each cell in network B.

Additionally, in the event that the target traffic amount is not achieved by just setting the CIOs for the cells in network B, it is possible to also adjust the so-called trigger parameter A3 offset. The A3 offset is normally set at a level at which only mobile devices with a poor signal, close to the edge of the cell, will trigger measurement report messages for a handover to a different cell. This is what essentially defines the cell edge in FIG. 9. If there is a need to change the number of mobile devices transferring to network B, application 412 can also change the A3 offset (e.g., in step 770). A negative change (i.e., lowering the A3 offset) would increase the number of mobile devices for which the signal level comparison will trigger a transfer. A positive change (i.e., increasing the A3 offset) would reduce the number of mobile devices for which the signal level comparison will trigger a transfer. This may be desirable, for example, in instance in which the maximum negative offset in the CIOs of network B still results in more handovers than desired. In order to keep changes in the A3 offset from affecting internal handovers in network A (i.e., handovers between neighboring cells in network A), the CIOs for neighboring cells in network A should be changed by the same amount. This leaves the relative values unchanged, such that intra-network handovers will not be affected.

FIG. 11 illustrates the effect of the A3 offset and the incremental changes in the CIOs, using the same graphical representation for signal quality discussed in conjunction with FIG. 9. The result of these incremental parameter changes is that some devices will initiate the handover procedure from cell A1 to cell B1 or B2 by sending measurement report messages to network A. This sets off the process described in FIG. 10. The target cells still have an opportunity to decline the handover request. However, normally the declination mechanism is not needed, since the number of mobile devices transferring between networks is controlled by adjusting the parameters that initiate the handovers.

As mobile devices execute the handover procedure, the load in cell A1 will decrease, and the load in cells B1 and B2 will increase. Notably, the demand—and therefore, the load—leaving cell A1 comes from an area in cell A1 with a poor signal. After the handover is complete, this same demand is subsequently served by a stronger signal in cells B1 and B2. This causes an increase in load on cells B1 and B2. However, simulation has shown that this increase in load on cells B1 and B1 is significantly less than the load caused by the mobile devices in the area of poor signal in cell A1. Therefore, the load decrease in cell A1 is greater than the total load increase in cells B1 and B2, when considered in terms of network resources (e.g., PRBs needed to satisfy the load in LTE networks). This is a very desirable characteristic of the disclosed mechanism, both in terms of efficient usage of resources and improvement in user experiences.

In an embodiment, the cross optimization uses the 3GPP standard's control handover events: Event A3 and Event A5. Event A3 is two measurements compared to each other, and Event A5 is two measurements compared to fixed thresholds. In accordance with the standard, CIOs are used to bias the measurement reports that are sent to the eNodeB by mobile devices. These reports trigger the initiation of handovers. CIOs can be used similarly for both Event A3 and Event A5.

Figure 12:
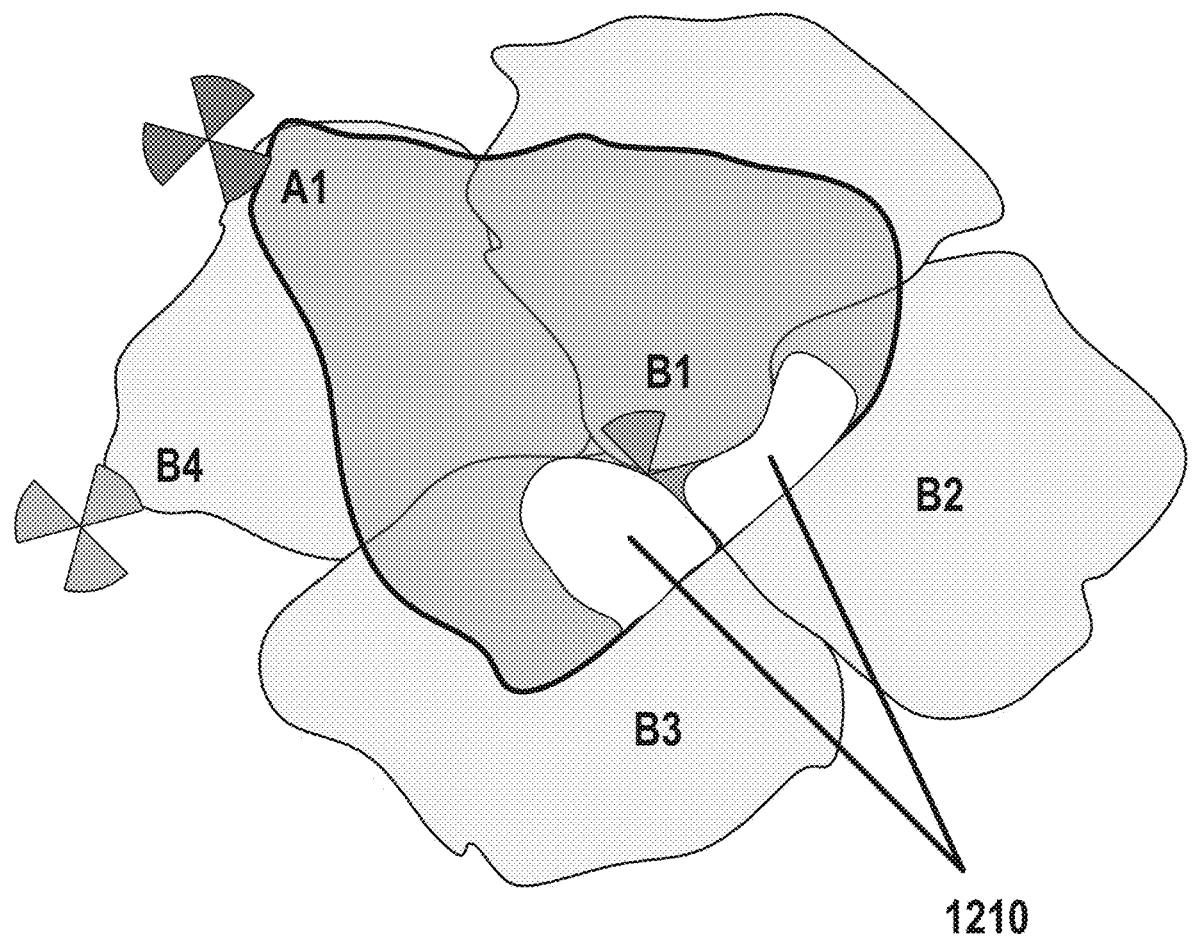
FIG. 12 illustrates overlapping networks, according to an embodiment.

Reference Signal Received Quality (RSRQ) and Reference Signal Received Power (RSRP) can be used for Event A3, according to LTE standards. In an embodiment, the cross optimization uses the RSRQ for Event A3, and optionally RSRP for Event A5. Application 412 calculates which cell pairs are appropriate for accomplishing performance objectives, and adds the appropriate overlapping cells to the neighbor list of a cell via the RRC Connection Reconfiguration message. For these new neighbor cells, application 412 sets the CIO values to ensure the intended portion of the demand will be transferred as a result of the handovers that take place. The CIOs added to handover parameters are specific to a cell pair, consisting of one cell in each network or frequency layer. For each cell in one network, there can be a calculated CIO for each of the overlapping cells in the other network. This is illustrated in FIG. 12.

Cell A1 in network A overlaps with four cells, B1-B4, in network B. In this scenario, assuming that cell A1 is over-loaded, the cross optimization of application 412 would likely move some mobile devices from cell A1 to at least some of cells B1, B2, and B3. The amount of traffic to move depends on the load (PRB occupation) levels in each of the cells. Assuming that cells B2 and B3 are underutilized, they would be added to the neighbor list for mobile devices in handover areas 1210 in cell A1. Handover areas 1210 are at the edge of cell A1. Thus, typically, signal quality will be weak in handover areas 1210, as compared to signal quality available from cells B2 and B3 in handover areas 1210. To accomplish the handovers in handover areas 1210, a relatively large negative bias, in the form of A3 CIO parameters for cell A1, could be set towards each of cells B2 and B3. Selection of the A3 CIO parameter for one or more cells in network B will regulate the amount of demand transfer. In this case, it would cause mobile devices in handover areas 1210 to be transferred to the new neighbor cells B2 or B3. The user experience for these mobile devices should improve for two reasons: they will get a better SINR; and they will be served by a cell with a lower load.

The LTE standard specifies the entering condition for Event A3 as:

$$Mn+Ofn+Ocn-Hys>Mp+Ofp+Ocp+Off$$

wherein Mn is the measurement of the neighboring cell,
wherein Ofn is the offset for frequency of the neighboring cell being measured,
wherein Ocn is the CIO for the neighboring cell being measured,
wherein Hys is the hysteresis parameter for this event,
wherein Mp is the measurement of the primary (i.e., serving) cell,
wherein Ofp is the offset for the frequency of the primary cell,
wherein Ocp is the CIO for the primary cell, and
wherein Off is the A3 offset parameter.

Typically, Hys and Off are global or event-specific values that are optimized and set by the MNO of the primary network. Assuming that Ofn, Ofp, Ocp, Hys, and Off are all set to zero, the entering condition for Event A3 reduces to:

$$Mn+Ocn>Mp$$

The CIO parameter, Ocn, is specific to a pair of cells, defined by Mn and Mp. In an embodiment, this standardized ability to modify and add precise pairs of biased cells, to invoke a measurement report message, is the mechanism that introduces the disclosed cross optimization into real-time operations. Mn and Mp define the precise pair of cells, and the Ocn parameter defines the calculated bias for that pair of cells. The pair of cells typically consists of two cells belonging to different networks (e.g., one "home" network cell, and one "visited" network cell of a partner network). The system-calculated CIO values are unique to each specific pair of cells. In cells where no demand transfer is required, no new neighbor cells are added.

With the disclosed cross optimization, device throughput will improve on the home network, because mobile devices will transfer to a cell offering a better combination of signal strength and load. The improved throughput will also result in an improved user experience by the users of the mobile devices subscribed to the home network.

Similar to the use of the Event A3 CIO parameters described above, the cross optimization may optionally use the Event A5, in order to increase coverage reliability by moving mobile devices with weak signals in the home network to a stronger signal in the visited network. Since Event A5 is based on absolute RSRP measurements, the result is improved reliability, coverage, and user experience.

The LTE standard specifies the entering condition for Event A5 as:

$$Mp+Hys<Thresh1$$

and $$Mn+Ofn+Ocn-Hys>Thresh2$$

wherein Mp is the measurement of the primary (i.e., serving) cell,
wherein Hys is the hysteresis parameter for this event,
wherein Thresh1 is a threshold parameter of the primary cell for this event,
wherein Mn is the measurement of the neighboring cell,
wherein Ofn is the offset for frequency of the neighboring cell being measured,
wherein Ocn is the CIO for the neighboring cell being measured, and
wherein Thresh2 is a threshold parameter of the neighboring cell for this event.

Typically, Hys, Thresh1, and Thresh2 are global or event-specific values that are optimized and set by the MNO of the primary network. Assuming that Ofn and Hys are set to zero, the entering condition for Event A5 reduces to:

$$Mp<Thresh1$$

and $$Mn+Ocn>Thresh2$$

Similar to Event A3, the CIO parameter, Ocn, is specific to the neighboring cell being measured, and can be used to ensure that the A5 Event is triggered only when a transfer to the neighboring cell will increase the RSRP.

8. Transporting Demand

In an embodiment, platform 410 offers a mechanism to transport mobile demand—and therefore, capacity—over long distances. This can be very useful, for example, when the implementation area includes both residential and commercial areas, since the peak load patterns for these two types of areas are counter-cyclical, as shown in FIG. 6.

Figure 13A:
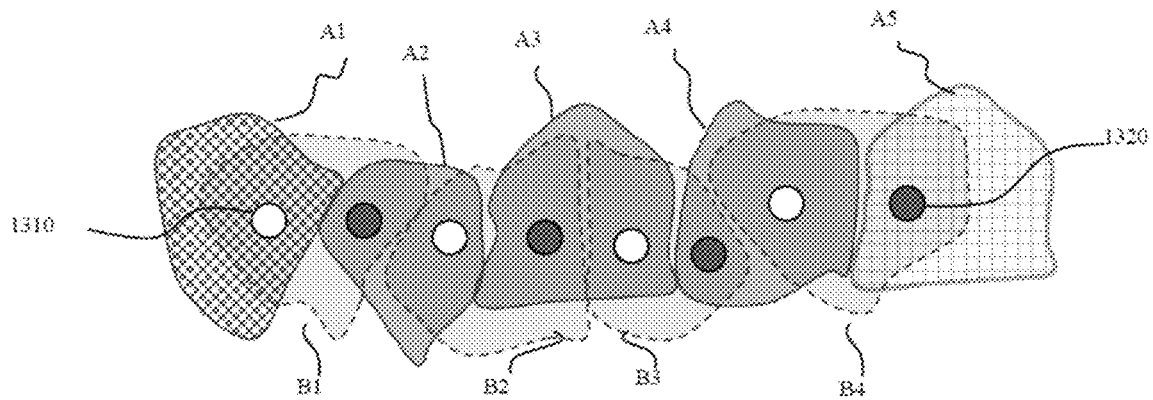
FIGS. 13A and 13B illustrate the transportation of demand across a large geographic distance, according to an embodiment.
Figure 13A:
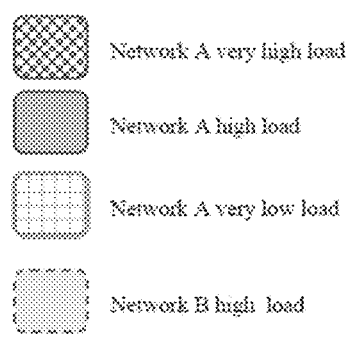
Figure 13B:
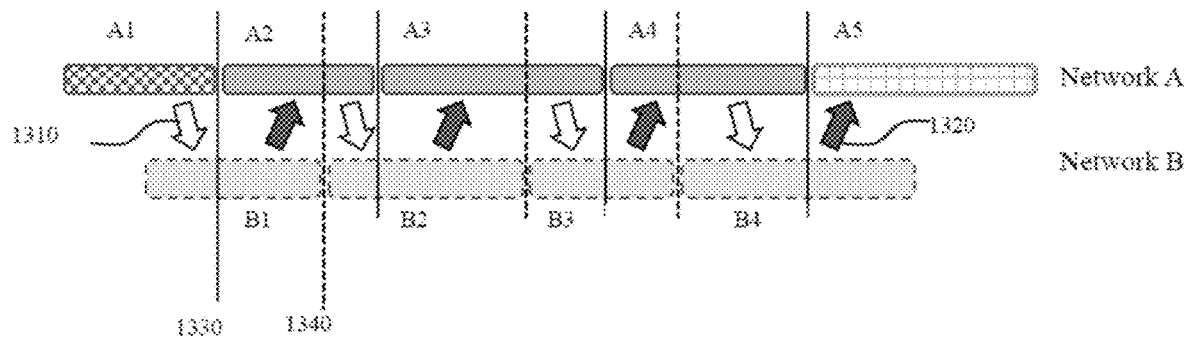
Figure 13B:
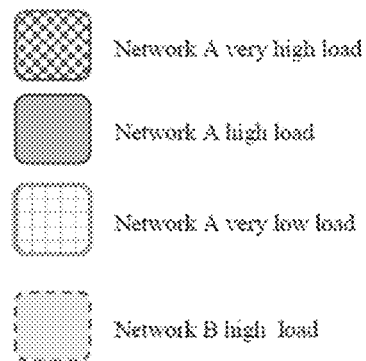

FIGS. 13A and 13B illustrate how mobile demand is transferred over a long distance from one area (e.g., commercial area) to another area (e.g., residential area), according to an embodiment. FIG. 13A illustrates a top view of a plurality of cells spread over a geographical area. Network A comprises a set of adjacent cells A1-A5, and network B comprises a set of adjacent cells B1-B4. Assume that cell A1 (e.g., a commercial area during the workday) has a very high load percentage, and needs to transfer demand away. Cells A2-A4 all have a high load, and therefore, are not in a position to add net load from other cells. However, cell A5 (e.g., a residential area during the workday) has a very low load, and therefore, is not being effectively utilized. Network B has overlapping coverage to network A. Specifically, as illustrated, cells B1-B4, overlap network A. However, all of these cells in network B have a high load. Therefore, network B cannot take on additional net load from network A. Consequently, in this illustrated example, the only cell capable of accepting additional load is cell A5.

FIG. 13B illustrates a side view of the same plurality of cells illustrated in FIG. 13A. The boundaries between adjacent cells in network A are illustrated by solid lines 1330, and the boundaries between adjacent cells in network B are illustrated by broken lines 1340. These lines also illustrate the projection of these boundaries to cells in the other network.

In an embodiment, demand is transferred from network A to an overlapping cell in network B in each of the areas indicated by light dots 1310 in FIG. 13A and light arrows in FIG. 13B. Contemporaneously, demand is transferred from network B to an overlapping cell in network A in each of the areas indicated by dark dots 1320 in FIG. 13A and dark arrows in FIG. 13B. If the corresponding load contributions in all of these transfers are the same, the net effect is that the load level in cells A2-A4 and B1-B4 will remain the same, while the very high load in cell A1 will have been reduced and the very low load in cell A5 will have been increased. This "ripple effect" of shifting demand between different networks in the overlap areas on the edges of cells can be used to transport or "hop" demand or capacity over long geographic distances.

In actual network situations, partial overlaps extend across the entire networks. The partial overlap is especially effective between networks of two independent MNOs, but can also exist between frequency bands in a single network. Thus, while an actual partial overlap between single frequency bands in two separate MNOs networks is illustrated in FIGS. 13A and 13B, it should be understood that the ripple effect may similarly be applied to a plurality of network layers in a single network. In addition, across these networks or network layers, the ripple effect can propagate in multiple directions at the same time.

9. Example Processing Device

Figure 14:
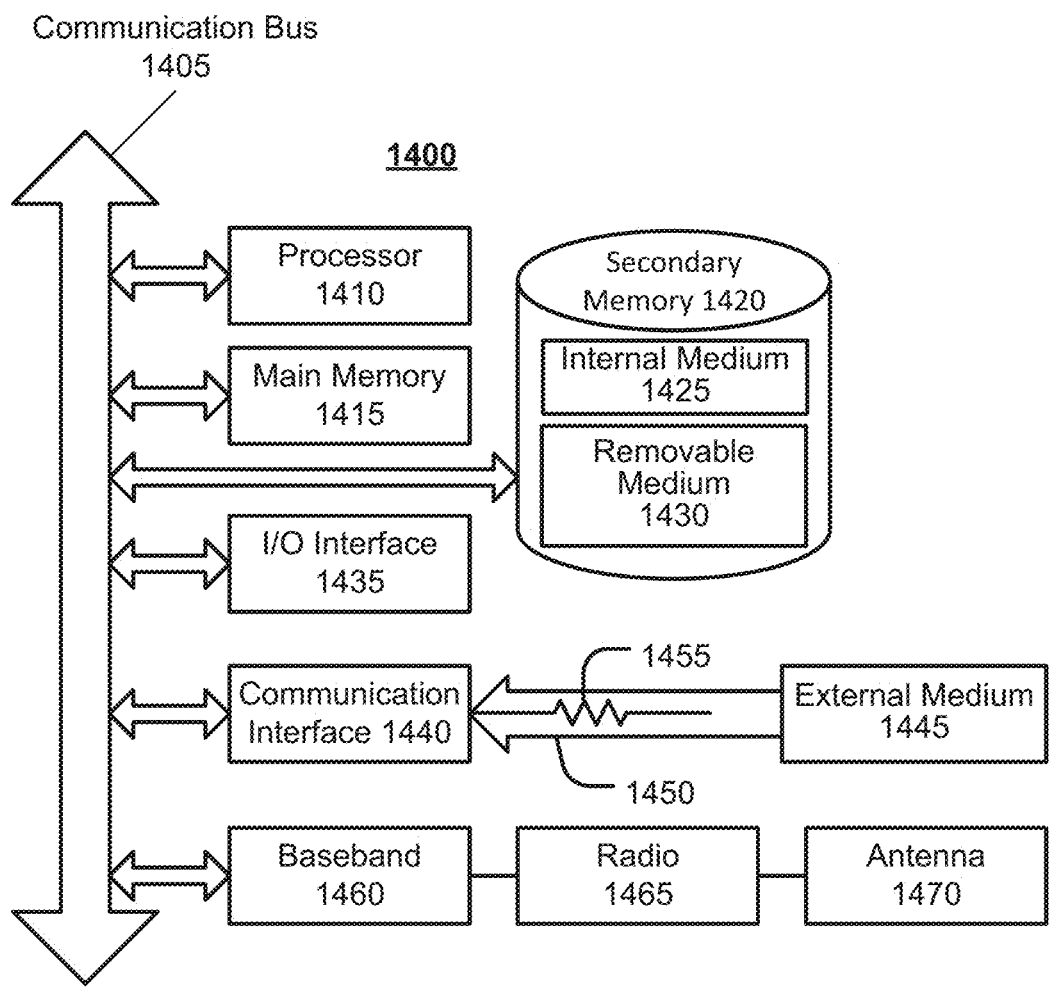
FIG. 14 illustrates an example processing system, by which one or more of the processed described herein, may be executed, according to an embodiment.

FIG. 14 is a block diagram illustrating an example wired or wireless system 1400 that may be used in connection with various embodiments described herein. For example, system 1400 may be used as or in conjunction with one or more of the functions, processes, or methods (e.g., to store and/or execute application 412, planning module 432, settings module 434, or one or more other software modules) described herein, and may represent components of any processing devices described herein, including platform 410, MNO system 430, and the mobile devices. System 1400 can be a server or any conventional personal computer, or any other processor-enabled device that is capable of wired or wireless data communication. Other computer systems and/or architectures may be also used, as will be clear to those skilled in the art.

System 1400 preferably includes one or more processors, such as processor 1410. Additional processors may be provided, such as an auxiliary processor to manage input/output, an auxiliary processor to perform floating-point mathematical operations, a special-purpose microprocessor having an architecture suitable for fast execution of signal-processing algorithms (e.g., digital-signal processor), a slave processor subordinate to the main processing system (e.g., back-end processor), an additional microprocessor or controller for dual or multiple processor systems, and/or a coprocessor. Such auxiliary processors may be discrete processors or may be integrated with processor 1410. Examples of processors which may be used with system 1400 include, without limitation, the Pentium® processor, Core i7® processor, and Xeon® processor, all of which are available from Intel Corporation of Santa Clara, California.

Processor 1410 is preferably connected to a communication bus 1405. Communication bus 1405 may include a data channel for facilitating information transfer between storage and other peripheral components of system 1400. Furthermore, communication bus 1405 may provide a set of signals used for communication with processor 1410, including a data bus, address bus, and/or control bus (not shown). Communication bus 1405 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and/or the like.

System 1400 preferably includes a main memory 1415 and may also include a secondary memory 1420. Main memory 1415 provides storage of instructions and data for programs executing on processor 1410, such as one or more of the functions and/or modules discussed herein. It should be understood that programs stored in the memory and executed by processor 1410 may be written and/or compiled according to any suitable language, including without limitation C/C++, Java, JavaScript, Perl, Visual Basic, .NET, and the like. Main memory 1415 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 1420 may optionally include an internal medium 1425 and/or a removable medium 1430. Removable medium 1430 is read from and/or written to in any well-known manner. Removable storage medium 1430 may be, for example, a magnetic tape drive, a compact disc (CD) drive, a digital versatile disc (DVD) drive, other optical drive, a flash memory drive, and/or the like.

Secondary memory 1420 is a non-transitory computer-readable medium having computer-executable code (e.g., disclosed software modules) and/or other data stored thereon. The computer software or data stored on secondary memory 1420 is read into main memory 1415 for execution by processor 1410.

In alternative embodiments, secondary memory 1420 may include other similar means for allowing computer programs or other data or instructions to be loaded into system 1400. Such means may include, for example, a communication interface 1440, which allows software and data to be transferred from external storage medium 1445 to system 1400. Examples of external storage medium 1445 may include an external hard disk drive, an external optical drive, an external magneto-optical drive, and/or the like. Other examples of secondary memory 1420 may include semiconductor-based memory, such as programmable read-only memory (PROM), erasable programmable read-only memory (EPROM), electrically erasable read-only memory (EEPROM), and flash memory (block-oriented memory similar to EEPROM).

As mentioned above, system 1400 may include a communication interface 1440. Communication interface 1440 allows software and data to be transferred between system 1400 and external devices (e.g. printers), networks, or other information sources. For example, computer software or executable code may be transferred to system 1400 from a network server (e.g., platform 110) via communication interface 1440. Examples of communication interface 1440 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 1400 with a network (e.g., network(s) 120) or another computing device. Communication interface 1440 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 1440 are generally in the form of electrical communication signals 1455. These signals 1455 may be provided to communication interface 1440 via a communication channel 1450. In an embodiment, communication channel 1450 may be a wired or wireless network (e.g., network(s) 120), or any variety of other communication links. Communication channel 1450 carries signals 1455 and can be implemented using a variety of wired or wireless communication means including wire or cable, fiber optics, conventional phone line, cellular phone link, wireless data communication link, radio frequency ("RF") link, or infrared link, just to name a few.

Computer-executable code (e.g., computer programs, such as disclosed application 412 or other software modules) is stored in main memory 1415 and/or secondary memory 1420. Computer programs can also be received via communication interface 1440 and stored in main memory 1415 and/or secondary memory 1420. Such computer programs, when executed, enable system 1400 to perform the various functions of the disclosed embodiments as described elsewhere herein.

In this description, the term "computer-readable medium" is used to refer to any non-transitory computer-readable storage media used to provide computer-executable code and/or other data to or within system 1400. Examples of such media include main memory 1415, secondary memory 1420 (including internal memory 1425, removable medium 1430, and external storage medium 1445), and any peripheral device communicatively coupled with communication interface 1440 (including a network information server or other network device). These non-transitory computer-readable media are means for providing executable code, programming instructions, software, and/or other data to system 1400.

In an embodiment that is implemented using software, the software may be stored on a computer-readable medium and loaded into system 1400 by way of removable medium 1430, I/O interface 1435, or communication interface 1440. In such an embodiment, the software is loaded into system 1400 in the form of electrical communication signals 1455. The software, when executed by processor 1410, preferably causes processor 1410 to perform one or more of the processes and functions described elsewhere herein.

In an embodiment, I/O interface 1435 provides an interface between one or more components of system 1400 and one or more input and/or output devices. Example input devices include, without limitation, sensors, keyboards, touch screens or other touch-sensitive devices, biometric sensing devices, computer mice, trackballs, pen-based pointing devices, and/or the like. Examples of output devices include, without limitation, other processing devices, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch panel display (e.g., in a smartphone, tablet, or other mobile device).

System 1400 may also include optional wireless communication components that facilitate wireless communication over a voice network and/or a data network (e.g., in the case of user system 130). The wireless communication components comprise an antenna system 1470, a radio system 1465, and a baseband system 1460. In system 1400, radio frequency (RF) signals are transmitted and received over the air by antenna system 1470 under the management of radio system 1465.

In an embodiment, antenna system 1470 may comprise one or more antennae and one or more multiplexors (not shown) that perform a switching function to provide antenna system 1470 with transmit and receive signal paths. In the receive path, received RF signals can be coupled from a multiplexor to a low noise amplifier (not shown) that amplifies the received RF signal and sends the amplified signal to radio system 1465.

In an alternative embodiment, radio system 1465 may comprise one or more radios that are configured to communicate over various frequencies. In an embodiment, radio system 1465 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 1465 to baseband system 1460.

If the received signal contains audio information, then baseband system 1460 decodes the signal and converts it to an analog signal. Then the signal is amplified and sent to a speaker. Baseband system 1460 also receives analog audio signals from a microphone. These analog audio signals are converted to digital signals and encoded by baseband system 1460. Baseband system 1460 also encodes the digital signals for transmission and generates a baseband transmit audio signal that is routed to the modulator portion of radio system 1465. The modulator mixes the baseband transmit audio signal with an RF carrier signal, generating an RF transmit signal that is routed to antenna system 1470 and may pass through a power amplifier (not shown). The power amplifier amplifies the RF transmit signal and routes it to antenna system 1470, where the signal is switched to the antenna port for transmission.

Baseband system 1460 is also communicatively coupled with processor 1410, which may be a central processing unit (CPU). Processor 1410 has access to data storage areas 1415 and 1420. Processor 1410 is preferably configured to execute instructions (i.e., computer programs, such as disclosed application 412 or other software modules) that can be stored in main memory 1415 or secondary memory 1420. Computer programs can also be received from baseband processor 1460 and stored in main memory 1410 or in secondary memory 1420, or executed upon receipt. Such computer programs, when executed, enable system 1400 to perform the various functions of the disclosed embodiments.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. A method of using at least one hardware processor comprising the steps:
    for each of a plurality of network layers receive demand map information for the network layer, wherein the demand map information comprises cell load level and signal quality or throughput information at a plurality of geographic locations in multiple cells in each of at least two of the network layers;
    for one or more of the plurality of network layers, receive one or more objectives used in determining an optimal transfer of demand in multiple cells between the plurality of network layers at a plurality of geographic locations at which the plurality of network layers overlap;
    analyze load distributions and at least one performance parameter in each of the partial overlap areas for the multiple cells;
    determine the parameters for optimal transfer of devices from one network layer to other layers in each of the partial overlap areas for the multiple cells in each network layer based on both the load conditions and performance parameters, wherein the optimal transfer of demand is determined to achieve the one or more objectives using the at least one hardware processor and powerful computing tools, including cloud computing, over a plurality of iterations until one or more objectives are satisfied;
    determine one or more parameters to be used by at least one of the plurality of network layers to produce the optimal transfer of demand between at least two of the plurality of network layers in multiple cells at the one or more geographic locations at which the plurality of network layers overlap; and
    deliver the set of one or more parameters to the at least one network layer through an interface with at least one network layer.

2. The method of claim 1 wherein quality information for the network layer is an available signal parameter that indicates the quality or strength of the connection that can be achieved.

3. The method of claim 1 wherein the powerful computing tools utilize artificial intelligence.

4. The method of claim 2 wherein the signal parameters include at least one of signal-to-noise ratio (SNR), signal-to-interference-plus-noise ratio (SINR), channel quality indicator (CQI), reference signal received quality (RSRQ), reference signal received power (RSRP), and received signal strength indicator (RSSI).

5. The method of claim 4 wherein the one or more objectives include network speed or speed distribution and the step of determining one or more parameters to be used includes estimating the noise and interference differences between network layers.

6. The method of claim 4 wherein the one or more objectives include network layer capacity or layer capacity distribution or layer PRB occupation level improvement.

7. The method of claim 5 wherein in the set of one or more parameters include parameters to be used in a Radio Resource Control (RRC) message.

8. The method of claim 4 wherein the set of one or more parameters include parameters to be used in a System Information Block (SIB).

9. The method of claim 5 wherein the set of one or more parameters include parameters to be used to set the Cell Reselection Priority for each of the bands or cell reselection priority of the serving frequency.

10. The method of claim 5 wherein the set of one or more parameters include parameters to be used set the threshold of current cell Squal to perform inter-frequency or interRAT measurement.

11. The method of claim 5 wherein the set of one or more parameters include parameters to be used to set the q-Offset Freq or the offset applicable between serving and this frequency carrier.

12. The method of claim 5 wherein the set of one or more parameters include parameters to be used set the q-Offset Cell or the offset for the intra-frequency neighboring cell, which is used in evaluation for cell reselections.

13. A method of using at least one hardware processor comprising the steps:
    for each of a plurality of network layers receive demand map information for that network layer, collected during several reoccurring periods of time, wherein the wherein the demand map information comprises a cell load level and signal quality or throughput information at a plurality of geographic locations in multiple cells in each of at least two of the network layers and wherein the reoccurring time period may be one or both of a time of day and a day of a week;
    for one or more of the plurality of networks, receive one or more objectives for at least one of the reoccurring time periods;
    for at least one of the reoccurring time periods, analyze load distributions and at least one performance parameter in each of the partial overlap areas for all the multiple cells in each network layer based on both the load conditions and performance parameters;
    generate an optimal transfer of demand between the multiple cells in each of at least two networks layers at one or more of the plurality of geographic locations at which the plurality of networks overlap, wherein the optimal transfer of demand is determined based on both the load conditions and performance parameters and intended to achieve the one or more objectives using the at least one hardware processor and powerful computing tools, including cloud computing, over a plurality of iterations until one or more objectives are satisfied;

for at least one of the reoccurring time periods, determine a set of one or more parameters to be used by at least one of the plurality of network layers to produce the optimal transfer of demand between the plurality of network layers at the one or more geographic locations at which the plurality of networks overlap;

for at least one of the reoccurring time periods, generate a profile that associates the one or more parameters with the reoccurring time period; and for at least one of a plurality of different profiles, initiate use of the one or more parameters in the profile at each occurrence of the associated reoccurring time period.

14. A method of claim 13 wherein the recurring time periods are associated with specific identifiable events that result in a change in the population density or demand for cellular data, for example sporting events or conventions, rather than times of day or days of week, and where the initiation of the use of the profile based on the occurrence of the specific event with which the profile is associated.

15. The method of claim 13 wherein the estimation uses crowdsourcing data or is based on planning tool simulation for each of the plurality of network layers to estimate the noise and interference differences between bands.

16. A system comprising:
   at least one hardware processor; and
   one or more software modules configured to, when executed by the at least one hardware processor to,
   for one or more of a plurality of network layers receive demand map information for that network layer, wherein the demand map information comprises a load level and signal quality or throughput information at a plurality of geographic locations in multiple cells in each of at least two of the network layers;
   for one or more of the plurality of networks, receive one or more objectives;
   these objectives can represent target values, which are used in determining an optimal transfer of demand between multiple cells in each of at least two of the plurality of network layers at one or more of the plurality of geographic locations at which the plurality of network layers overlap;
   analyze load distributions and at least one performance parameter in each of the partial overlap areas for the multiple cells;
   determine the parameters for optimal transfer of devices from one network layer to other layers in each of the partial overlap areas for the multiple cells in each network layer based on both the load conditions and performance parameters, wherein the optimal transfer of demand is determined based on both the load conditions and performance parameters and intended to achieve the one or more objectives using the at least one hardware processor and powerful computing tools, including cloud computing, over a plurality of iterations until one or more objectives are satisfied;
   determine one or more parameters to be used by in multiple cells in at least one of the plurality of network layers to produce the optimal transfer of demand between at least two of the plurality of network layers at the one or more geographic locations at which the plurality of networks overlap;
   deliver the set of one or more parameters to the at least one network layer through an interface with the at least one network layer.

17. A non-transitory computer-readable medium having instructions stored therein, wherein the instructions, when executed by a processor, cause the processor to:
   for each of a plurality of network layers receive demand map information for that network layer, wherein the demand map information comprises a signal quality or throughput at a plurality of geographic locations in multiple cells in each of at least two of the network layers;
   for one or more of the plurality of network layers, receive one or more objectives;
   these objectives can represent target values, which are used in determining an optimal transfer of demand between multiple cells in each of at least two of the plurality of network layers at one or more of the plurality of geographic locations at which the plurality of network layers overlap;
   analyze load distributions and at least one performance parameter in each of the partial overlap areas for the multiple cells;
   determine the parameters for optimal transfer of devices from one network layer to other layers in each of the partial overlap areas for the multiple cells in each network layer based on both the load conditions and performance parameters, wherein the optimal transfer of demand is determined based on both the load conditions and performance parameters and intended to achieve the one or more objectives using the at least one hardware processor and powerful computing tools, including cloud computing, over a plurality of iterations until one or more objectives are satisfied;
   determine one or more parameters to be used in multiple cells in by at least one of the plurality of network layers to produce the optimal transfer of demand between at least two of the plurality of network layers at the one or more geographic locations at which the plurality of network layers overlap; and
   deliver the set of one or more parameters to the at least one network layer through an interface with the at least one network layer.

* * * * *